(12) United States Patent
Berkovich et al.

(10) Patent No.: US 11,935,291 B2
(45) Date of Patent: Mar. 19, 2024

(54) DISTRIBUTED SENSOR SYSTEM

(71) Applicant: Facebook Technologies, LLC, Menlo Park, CA (US)

(72) Inventors: Andrew Samuel Berkovich, Bellevue, WA (US); Xinqiao Liu, Medina, WA (US); Hans Reyserhove, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/083,920

(22) Filed: Oct. 29, 2020

(65) Prior Publication Data
US 2021/0133452 A1    May 6, 2021

Related U.S. Application Data

(60) Provisional application No. 62/928,233, filed on Oct. 30, 2019.

(51) Int. Cl.
*G06K 9/62* (2022.01)
*G06F 3/01* (2006.01)
(Continued)

(52) U.S. Cl.
CPC ............ *G06F 3/011* (2013.01); *G06F 18/251* (2023.01); *G06V 10/95* (2022.01); *G06V 20/20* (2022.01);
(Continued)

(58) Field of Classification Search
CPC .... G02B 2027/0187; G02B 2027/0178; G02B 2027/014; G02B 2027/0138; G02B 27/0172; G02B 27/017; B60R 2300/205
See application file for complete search history.

(56) References Cited

U.S. PATENT DOCUMENTS 6,384,905 B1    5/2002  Barrows
7,362,355 B1    4/2008  Yang et al.
(Continued)

FOREIGN PATENT DOCUMENTS

CN    103207716 A    7/2013
CN    103907133 A    7/2014
(Continued)

OTHER PUBLICATIONS

U.S. Appl. No. 16/715,792, "Non-Final Office Action", dated Jan. 1, 2021, 15 pages.
(Continued)

*Primary Examiner* — Howard D Brown, Jr.
(74) *Attorney, Agent, or Firm* — Kilpatrick Townsend & Stockton LLP

(57) ABSTRACT

In one example, a mobile device comprises: a physical link; a plurality of image sensors, each image sensor being configured to transmit image data via the physical link; and a controller coupled to the physical link, whereby the physical link, the plurality of image sensors, and the controller form a multi-drop network. The controller is configured to: transmit a control signal to configure image sensing operations at the plurality of image sensors; receive, via the physical link, image data from at least a subset of the plurality of image sensors; combine the image data from the at least a subset of the plurality of image sensors to obtain an extended field of view (FOV); determine information of a surrounding environment of the mobile device captured within the extended FOV; and provide the information to an application to generate content based on the information.

20 Claims, 24 Drawing Sheets

(51) Int. Cl.

| | |
|---|---|
| *G06F 18/25* | (2023.01) |
| *G06V 10/94* | (2022.01) |
| *G06V 20/20* | (2022.01) |
| *G06V 40/19* | (2022.01) |
| *H04N 5/225* | (2006.01) |
| *H04N 5/232* | (2006.01) |
| *H04N 7/22* | (2006.01) |
| *H04N 23/45* | (2023.01) |
| *H04N 23/698* | (2023.01) |

(52) U.S. Cl.
CPC ............ *G06V 40/19* (2022.01); *H04N 7/22* (2013.01); *H04N 23/45* (2023.01); *H04N 23/698* (2023.01)

(56) References Cited

U.S. PATENT DOCUMENTS

| | | |
|---|---|---|
| 7,659,925 B2 | 2/2010 | Krymski |
| 7,956,914 B2 | 6/2011 | Xu |
| 8,134,623 B2 | 3/2012 | Purcell et al. |
| 8,441,535 B2 | 5/2013 | Morin |
| 8,675,110 B2 | 3/2014 | Hirai et al. |
| 8,779,346 B2 | 7/2014 | Fowler et al. |
| 9,094,629 B2 | 7/2015 | Ishibashi |
| 9,210,330 B2 | 12/2015 | Seo |
| 9,282,264 B2 | 3/2016 | Park et al. |
| 9,363,454 B2 | 6/2016 | Ito et al. |
| 9,560,296 B2 | 1/2017 | Hseih et al. |
| 9,723,233 B2 | 8/2017 | Grauer et al. |
| 9,743,024 B2 | 8/2017 | Tyrrell et al. |
| 9,826,175 B2 | 11/2017 | Isobe |
| 9,832,370 B2 | 11/2017 | Cho et al. |
| 9,912,885 B2 | 3/2018 | Isobe |
| 9,955,091 B1 | 4/2018 | Dai et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,484,628 B2 | 11/2019 | Zhang et al. |
| 10,515,284 B2 | 12/2019 | Gousev et al. |
| 10,594,974 B2 | 3/2020 | Ivarsson et al. |
| 10,715,824 B2 | 7/2020 | Tall et al. |
| 10,726,627 B2 | 7/2020 | Liu |
| 10,897,586 B2 | 1/2021 | Liu et al. |
| 10,915,995 B2 | 2/2021 | Moloney |
| 10,939,062 B2 | 3/2021 | Ogawa et al. |
| 10,970,619 B1 | 4/2021 | Xiao et al. |
| 10,984,235 B2 | 4/2021 | Gousev et al. |
| 10,999,539 B2 | 5/2021 | Wendel et al. |
| 11,057,581 B2 | 7/2021 | Liu |
| 2002/0113886 A1 | 8/2002 | Hynecek |
| 2003/0020100 A1 | 1/2003 | Guidash |
| 2005/0057389 A1 | 3/2005 | Krymski |
| 2005/0237380 A1 | 10/2005 | Kakii et al. |
| 2007/0076109 A1 | 4/2007 | Krymski |
| 2007/0222881 A1 | 9/2007 | Mentzer |
| 2008/0007731 A1 | 1/2008 | Botchway et al. |
| 2008/0226170 A1 | 9/2008 | Sonoda |
| 2009/0033588 A1* | 2/2009 | Kajita ............... G02B 27/0172 345/2.3 |
| 2009/0245637 A1 | 10/2009 | Barman et al. |
| 2010/0194956 A1 | 8/2010 | Yuan et al. |
| 2010/0245600 A1 | 9/2010 | Chang et al. |
| 2010/0276572 A1 | 11/2010 | Iwabuchi et al. |
| 2011/0155892 A1 | 6/2011 | Neter et al. |
| 2011/0254986 A1 | 10/2011 | Nishimura et al. |
| 2012/0044399 A1 | 2/2012 | Hirai et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0133807 A1 | 5/2012 | Wu et al. |
| 2012/0200499 A1* | 8/2012 | Osterhout ............... G06F 1/163 345/158 |
| 2012/0212465 A1 | 8/2012 | White et al. |
| 2012/0262616 A1 | 10/2012 | Sa et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1* | 3/2013 | Petrou .................. G06F 3/012 340/573.1 |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0215290 A1 | 8/2013 | Solhusvik et al. |
| 2013/0293753 A1 | 11/2013 | Keelan et al. |
| 2013/0299674 A1 | 11/2013 | Fowler et al. |
| 2014/0042299 A1 | 2/2014 | Wan et al. |
| 2014/0055635 A1 | 2/2014 | Seo |
| 2014/0063250 A1 | 3/2014 | Park |
| 2014/0247382 A1 | 9/2014 | Moldovan et al. |
| 2014/0368687 A1 | 12/2014 | Yu et al. |
| 2015/0085134 A1 | 3/2015 | Novotny et al. |
| 2015/0189209 A1 | 7/2015 | Yang et al. |
| 2015/0201142 A1 | 7/2015 | Smith et al. |
| 2015/0222827 A1 | 8/2015 | Isobe |
| 2015/0229859 A1 | 8/2015 | Guidash et al. |
| 2015/0279884 A1 | 10/2015 | Kusumoto |
| 2015/0309311 A1* | 10/2015 | Cho ...................... G02B 27/017 345/8 |
| 2015/0309316 A1 | 10/2015 | Osterhout et al. |
| 2015/0312502 A1 | 10/2015 | Borremans |
| 2015/0358571 A1 | 12/2015 | Dominguez Castro et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0048964 A1* | 2/2016 | Kruglick ............... G06V 10/50 382/103 |
| 2016/0078614 A1 | 3/2016 | Ryu et al. |
| 2016/0088253 A1 | 3/2016 | Tezuka |
| 2016/0100115 A1 | 4/2016 | Kusano |
| 2016/0165160 A1 | 6/2016 | Hseih et al. |
| 2016/0210785 A1 | 7/2016 | Balachandreswaran et al. |
| 2016/0344965 A1 | 11/2016 | Grauer et al. |
| 2016/0360127 A1 | 12/2016 | Dierickx et al. |
| 2017/0039906 A1 | 2/2017 | Jepsen |
| 2017/0041571 A1 | 2/2017 | Tyrrell et al. |
| 2017/0117310 A1 | 4/2017 | Tatani et al. |
| 2017/0154909 A1 | 6/2017 | Ishizu |
| 2017/0161579 A1 | 6/2017 | Gousev et al. |
| 2017/0228345 A1 | 8/2017 | Gupta et al. |
| 2017/0270664 A1 | 9/2017 | Hoogi et al. |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0338262 A1 | 11/2017 | Hirata |
| 2017/0339327 A1* | 11/2017 | Koshkin ............... H04N 23/73 |
| 2018/0027174 A1 | 1/2018 | Sengoku |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0224658 A1* | 8/2018 | Teller .................. G06F 3/017 |
| 2018/0239108 A1 | 8/2018 | Ishii et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0284594 A1 | 10/2018 | Gao |
| 2019/0035154 A1 | 1/2019 | Liu |
| 2019/0046044 A1* | 2/2019 | Tzvieli ................ A61B 5/0833 |
| 2019/0098232 A1 | 3/2019 | Mori et al. |
| 2019/0110039 A1 | 4/2019 | Linde et al. |
| 2019/0123088 A1 | 4/2019 | Kwon |
| 2019/0149751 A1 | 5/2019 | Wise |
| 2019/0172227 A1* | 6/2019 | Kasahara ............. G06F 1/1694 |
| 2019/0191116 A1 | 6/2019 | Madurawe |

(56) References Cited

U.S. PATENT DOCUMENTS

| | | | |
|---|---|---|---|
| 2019/0199946 A1 | 6/2019 | Wendel et al. | |
| 2019/0246036 A1 | 8/2019 | Wu et al. | |
| 2019/0253650 A1 | 8/2019 | Kim | |
| 2019/0307313 A1 | 10/2019 | Wade | |
| 2019/0331914 A1* | 10/2019 | Lee | G06F 3/013 |
| 2019/0363118 A1 | 11/2019 | Berkovich et al. | |
| 2020/0053299 A1 | 2/2020 | Zhang et al. | |
| 2020/0098096 A1 | 3/2020 | Moloney | |
| 2020/0193206 A1 | 6/2020 | Turkelson et al. | |
| 2020/0195828 A1 | 6/2020 | Reyserhove et al. | |
| 2020/0195875 A1 | 6/2020 | Berkovich et al. | |
| 2021/0026796 A1* | 1/2021 | Graif | G06F 13/4282 |
| 2021/0110187 A1 | 4/2021 | Pillai et al. | |
| 2021/0142086 A1 | 5/2021 | Berkovich et al. | |
| 2021/0185264 A1 | 6/2021 | Wong et al. | |
| 2021/0227159 A1 | 7/2021 | Sambonsugi | |
| 2021/0306586 A1 | 9/2021 | Yamamoto et al. | |
| 2021/0368124 A1 | 11/2021 | Berkovich et al. | |
| 2021/0409625 A1 | 12/2021 | Zhu et al. | |
| 2022/0021833 A1 | 1/2022 | Berkovich | |

FOREIGN PATENT DOCUMENTS

| | | |
|---|---|---|
| CN | 104204904 A | 12/2014 |
| CN | 106255978 A | 12/2016 |
| CN | 106791504 A | 5/2017 |
| CN | 107005641 A | 8/2017 |
| CN | 109298528 A | 2/2019 |
| EP | 1746820 A1 | 1/2007 |
| EP | 1788802 A1 | 5/2007 |
| EP | 2037505 A1 | 3/2009 |
| EP | 2804074 A2 | 11/2014 |
| EP | 3229457 A1 | 10/2017 |
| EP | 3833005 A1 | 6/2021 |
| JP | 2003319262 A | 11/2003 |
| JP | 2008270500 A | 11/2008 |
| WO | 2014055391 A2 | 4/2014 |
| WO | 2016095057 A1 | 6/2016 |
| WO | 2017003477 A1 | 1/2017 |
| WO | 2017013806 A1 | 1/2017 |
| WO | 2017047010 A1 | 3/2017 |
| WO | 2019018084 A1 | 1/2019 |
| WO | 2019111528 A1 | 6/2019 |
| WO | 2019145578 A1 | 8/2019 |

OTHER PUBLICATIONS

PCT/US2019/034007, "International Search Report and Written Opinion", dated Oct. 28, 2019, 19 pages.

PCT/US2019/066805, "International Search Report and Written Opinion", dated Mar. 6, 2020, 13 pages.

PCT/US2019/066831, "International Search Report and Written Opinion", dated Feb. 27, 2020, 15 pages.

U.S. Appl. No. 16/421,441, "Non-Final Office Action", dated May 7, 2021, 17 pages.

U.S. Appl. No. 16/715,792, "Notice of Allowance", dated Apr. 16, 2021, 10 pages.

U.S. Appl. No. 16/716,050, "Non-Final Office Action", dated May 14, 2021, 16 pages.

PCT/US2020/044807, "International Search Report and Written Opinion", dated Sep. 30, 2020, 12 pages.

PCT/US2020/059636, "International Search Report and Written Opinion", dated Feb. 11, 2021, 18 pages.

U.S. Appl. No. 16/715,792, "Notice of Allowance", dated Aug. 25, 2021, 9 pages.

PCT/US2021/033321, "International Search Report and Written Opinion", dated Sep. 6, 2021, 11 pages.

Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.

Cho K., et al., "A Low Power Dual CDS for a Column-Parallel CMOS Image Sensor," Journal of Semiconductor Technology and Science, Dec. 30, 2012, vol. 12 (4), pp. 388-396.

Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.

Corrected Notice of Allowability dated Apr. 9, 2021 for U.S. Appl. No. 16/255,528, filed Jan. 23, 2019, 5 Pages.

Extended European Search Report for European Application No. 18179846.3, dated Dec. 7, 2018, 10 Pages.

Extended European Search Report for European Application No. 18179851.3, dated Dec. 7, 2018, 8 Pages.

Extended European Search Report for European Application No. 19743908.6, dated Sep. 30, 2020, 9 Pages.

Final Office Action dated Oct. 18, 2021 for U.S. Appl. No. 16/716,050, filed Dec. 16, 2019, 18 Pages.

Final Office Action dated Oct. 21, 2021 for U.S. Appl. No. 16/421,441, filed May 23, 2019, 23 Pages.

Final Office Action dated Jan. 27, 2021 for U.S. Appl. No. 16/255,528, filed Jan. 23, 2019, 31 Pages.

International Search Report and Written Opinion for International Application No. PCT/US2018/039350, dated Nov. 15, 2018, 11 Pages.

International Search Report and Written Opinion for International Application No. PCT/US2018/039352, dated Oct. 26, 2018, 8 Pages.

International Search Report and Written Opinion for International Application No. PCT/US2018/039431, dated Nov. 7, 2018, 12 Pages.

International Search Report and Written Opinion for International Application No. PCT/US2020/058097, dated Feb. 12, 2021, 09 Pages.

International Search Report and Written Opinion for International Application No. PCT/US2021/031201, dated Aug. 2, 2021, 13 Pages.

Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.

Non-Final Office Action dated Sep. 2, 2021 for U.S. Appl. No. 16/910,844, filed Jun. 24, 2020, 7 Pages.

Non-Final Office Action dated Jul. 10, 2020 for U.S. Appl. No. 16/255,528, filed Jan. 23, 2019, 27 Pages.

Non-Final Office Action dated Nov. 23, 2018 for U.S. Appl. No. 15/847,517, filed Dec. 19, 2017, 21 Pages.

Non-Final Office Action dated Jul. 25, 2019 for U.S. Appl. No. 15/909,162, filed Mar. 1, 2018, 20 Pages.

Notice of Allowance dated Apr. 1, 2021 for U.S. Appl. No. 16/255,528, filed Jan. 23, 2019, 7 Pages.

Notice of Allowance dated Mar. 18, 2020 for U.S. Appl. No. 15/909,162, filed Mar. 1, 2018, 9 Pages.

Notice of Allowance dated Dec. 22, 2021 for U.S. Appl. No. 16/910,844, filed Jun. 24, 2020, 7 pages.

Notice of Allowance dated Nov. 24, 2021 for U.S. Appl. No. 16/910,844, filed Jun. 24, 2020, 8 pages.

Office Action dated Jul. 3, 2020 for Chinese Application No. 201810821296, filed Jul. 24, 2018, 17 Pages.

Office Action dated Mar. 9, 2021 for Chinese Application No. 201810821296, filed Jul. 24, 2018, 10 Pages.

Office Action dated Jun. 28, 2020 for Chinese Application No. 201810821296, filed Jul. 24, 2018, 2 Pages.

Partial European Search Report for European Application No. 18179838.0, dated Dec. 5, 2018, 13 Pages.

Restriction Requirement dated Feb. 2, 2021 for U.S. Appl. No. 16/716,050, filed Dec. 16, 2019, 7 Pages.

Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.

Shi C., et al., "A 1000fps Vision Chip Based on a Dynamically Reconfigurable Hybrid Architecture Comprising a PE Array and

(56) References Cited

OTHER PUBLICATIONS

Self-Organizing Map Neural Network," International Solid-State Circuits Conference, Session 7, Image Sensors, Feb. 10, 2014, pp. 128-130, XP055826878.
Non-Final Office Action dated Mar. 2, 2022 for U.S. Appl. No. 17/127,670, filed Dec. 18, 2020, 18 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Office Action dated Apr. 5, 2022 for European Patent Application No. 19731047.7, filed May 24, 2019, 7 pages.
Final Office Action dated Oct. 6, 2022 for U.S. Appl. No. 17/127,670, filed Dec. 18, 2020, 20 pages.
International Search Report and Written Opinion for International Application No. PCT/US2022/034259, dated Oct. 21, 2022, 10 pages.
Invitation to Pay Additional Fees and Where Applicable, Protest Fee for International Application No. PCT/US2021/041775, dated Oct. 8, 2021, 12 pages.
Non-Final Office Action dated Nov. 2, 2022 for U.S. Appl. No. 16/983,863, filed Aug. 3, 2020, 20 pages.
Notice of Allowance dated Sep. 2, 2022 for U.S. Appl. No. 16/715,792, filed Dec. 16, 2019, 9 pages.
Notice of Allowance dated Sep. 6, 2022 for U.S. Appl. No. 16/421,441, filed May 23, 2019, 17 pages.
Notice of Allowance dated Sep. 8, 2022 for U.S. Appl. No. 17/324,803, filed May 19, 2021, 8 pages.
Notice of Allowance dated Sep. 9, 2022 for U.S. Appl. No. 17/091,331, filed Nov. 6, 2020, 2 pages.
Notice of Allowance dated Jun. 17, 2022 for U.S. Appl. No. 16/715,792, filed Dec. 16, 2019, 2 pages.
Notice of Allowance dated Sep. 19, 2022 for U.S. Appl. No. 16/716,050, filed Dec. 16, 2019, 13 pages.
Notice of Allowance dated Jun. 2, 2022 for U.S. Appl. No. 16/716,050, filed Dec. 16, 2019, 13 pages.
Notice of Allowance dated May 23, 2022 for U.S. Appl. No. 17/324,803, filed May 19, 2021, 9 pages.
Notice of Allowance dated Aug. 24, 2022 for U.S. Appl. No. 17/091,331, filed Nov. 6, 2020, 9 pages.
Notice of Allowance dated Jun. 24, 2022 for U.S. Appl. No. 16/421,441, filed May 23, 2019, 17 pages.
Notice of Allowance dated May 24, 2022 for U.S. Appl. No. 16/715,792, filed Dec. 16, 2019, 9 pages.
Notice of Allowance dated Sep. 28, 2022 for U.S. Appl. No. 16/716,050, filed Dec. 16, 2019, 6 pages.
Notice of Allowance dated Jun. 3, 2022 for U.S. Appl. No. 17/324,803, filed May 19, 2021, 6 pages.
Office Action dated Aug. 11, 2022 for European Patent Application No. 19731047.7, filed May 24, 2019, 10 pages.
Office Action dated Aug. 17, 2022 for Chinese Application No. 201980083991.5, filed Jun. 17, 2021, 24 pages.
Office Action dated Jul. 29, 2022 for Taiwan Application No. 108118209, filed May 27, 2019, 15 pages.
Corrected Notice of Allowance dated Apr. 18, 2023 for U.S. Appl. No. 17/127,670, filed Mar. 5, 2021, 2 pages.
Final Office Action dated Apr. 12, 2023 for U.S. Appl. No. 16/983,863, filed Aug. 3, 2020, 21 pages.
International Search Report and Written Opinion for International Application No. PCT/US2023/011630, dated Apr. 6, 2023, 10 pages.
Non-Final Office Action dated Feb. 2, 2023 for U.S. Appl. No. 17/469,258, filed Sep. 8, 2021, 17 pages.
Non-Final Office Action dated Mar. 6, 2023 for U.S. Appl. No. 17/992,648, filed Nov. 22, 2022, 24 pages.
Notice of Allowance dated Feb. 8, 2023 for U.S. Appl. No. 17/324,803, filed May 19, 2021, 8 pages.
Notice of Allowance dated Apr. 19, 2023 for U.S. Appl. No. 16/715,792, filed Dec. 16, 2019, 9 pages.
Notice of Allowance dated Jan. 26, 2023 for U.S. Appl. No. 16/716,050, filed Dec. 16, 2019, 14 pages.
Notice of Allowance dated Mar. 27, 2023 for U.S. Appl. No. 17/127,670, filed Dec. 18, 2020, 9 pages.
Notice of Allowance dated Mar. 28, 2023 for U.S. Appl. No. 17/091,331, filed Nov. 6, 2020, 5 pages.
Office Action dated Feb. 11, 2023 for Chinese Application No. 201980048866.0, filed May 24, 2019, 20 Pages.
Office Action dated Feb. 13, 2023 for Taiwan Application No. 108146255, filed Dec. 17, 2019, 30 pages.
Office Action dated Mar. 14, 2023 for Taiwan Application No. 108146257, filed Dec. 17, 2019, 25 pages.
Office Action dated Mar. 23, 2023 for Chinese Application No. 201980083991.5, filed Jun. 17, 2021, 21 pages.
Notice of Allowance dated May 15, 2023 for U.S. Appl. No. 16/421,441, filed May 23, 2019, 10 pages.
Notice of Allowance dated May 22, 2023 for U.S. Appl. No. 17/324,803, filed May 19, 2021, 5 pages.

* cited by examiner

DISTRIBUTED SENSOR SYSTEM

RELATED APPLICATION

This patent application claims priority to U.S. Provisional Patent Application Ser. No. 62/928,233, titled "DISTRIBUTED SENSOR SYSTEM" and filed on Oct. 30, 2019, which is assigned to the assignee hereof and is incorporated herein by reference in its entirety for all purposes.

FIELD

The disclosure relates generally to sensor networks, and more specifically to a sensor network in a wearable electronic device such as a head mounted display (HMD).

BACKGROUND

A wearable electronic device may include numerous sensors to support different applications of the device. For example, wearable virtual-reality (VR) systems, augmented-reality (AR) systems, and mixed reality (MR) systems may include numerous image sensors, audio sensors, motion sensors, etc. The sensors can be used to collect sensor data of a physical environment in which a user is located to support various applications, such as a simultaneous localization and mapping (SLAM) algorithm to track a location of the user of the wearable electronic device, an object detection/measurement application, etc. Based on the sensor data, the VR/AR/MR system can generate and update, for example, virtual image data for displaying to the user via the near-eye display, audio data for outputting to the user via a speaker, etc., to provide an interactive experience to the user.

To improve sensing of the surrounding environment, a wearable electronic device may include one or more high-resolution image sensor modules. Each image sensor module may include a lens stack and a high-resolution image sensor to capture high-resolution images. But integrating such a network of high-resolution sensor modules in a wearable electronic device can be challenging. Specifically, high-resolution sensor modules typically require a large silicon area with relatively large form factor, whereas the field-of-view (FOV) lens stack may have a substantial vertical height, all of which makes it difficult to integrate modules in a wearable electronic device where space is very limited. Moreover, generation of high-resolution image data, as well as transmission and processing of high-resolution image data, typically consume a lot of power, while mobile device typically operates with very limited power budget. All these make it challenging to implement a wearable device that provides high quality sensing of the surrounding environment.

SUMMARY

The present disclosure relates to sensor networks. More specifically, and without limitation, this disclosure relates to a sensor network that can be used in a wearable electronic device such as a HMD.

In one example, a mobile device comprises: a physical link; a plurality of image sensors, each of the plurality of image sensors being configured to transmit image data via the physical link; and a controller coupled to the physical link, whereby the physical link, the plurality of image sensors, and the controller form a multi-drop network. The controller is configured to: transmit a control signal to configure image sensing operations at the plurality of image sensors; receive, via the physical link, image data from at least a subset of the plurality of image sensors; combine the image data from the at least a subset of the plurality of image sensors to obtain an extended field of view (FOV) larger than a FOV provided by each image sensor of the subset of image sensors; determine information of a surrounding environment of the mobile device captured within the extended FOV; and provide the information to an application to generate content based on the information.

In some aspects, the controller is configured to, based on transmitting the control signal, select the subset of the plurality of image sensors to transmit the image data and disable the rest of the plurality of image sensors.

In some aspects, the image data is first image data. The controller is configured to, based on transmitting the control signal: control the subset of the plurality of image sensors to transmit the first image data at a first resolution; and control the rest of the plurality of image sensors to transmit second image data at a second resolution. The first resolution is higher than the second resolution.

In some aspects, the image data is first image data. The controller is configured to, based on transmitting the control signal: control the subset of the plurality of image sensors to transmit the first image data at a first frame rate; and control the rest of the plurality of image sensors to transmit second image data at a second frame rate, The first frame rate is higher than the second frame rate.

In some aspects, the information of the surrounding environment includes a tracking result of an object of interest. The controller is configured to select the subset of the plurality of image sensors based on determining that the image data generated by the subset of the plurality of image sensors is likely to contain one or more images of the object.

In some aspects, the controller is configured to determine that the image data generated by the subset of the plurality of image sensors is likely to contain one or more images of the object based on detecting features of the object in prior image data from the subset of the plurality of image sensors.

In some aspects, the controller is configured to determine a prior trajectory of relative movement between the object and the mobile device based on prior image data from the plurality of image sensors. The controller is configured to: predict a trajectory of the object based on the prior trajectory; and determine that the image data generated by the subset of the plurality of image sensors is likely to contain one or more images of the object based on the predicted trajectory.

In some aspects, each image sensor of the plurality of image sensors includes an array of pixel cells. The controller is configured to, based on transmitting the control signal, selectively configure an image capturing operation of a particular subset of pixel cells of the array of pixel cells in one or more image sensor of the plurality of image sensors.

In some aspects, the controller is configured to, based on transmitting the control signal: enable a first subset of pixel cells of the array of pixel cells of a first image sensor of the plurality of image sensors to transmit first image data via the physical link to the controller; and enable a second subset of pixel cells of the array of pixel cells of a second image sensor of the plurality of image sensors to transmit second image data via the physical link to the controller. The first subset and the second subset are different. The controller is configured to, based on transmitting the control signal: enable a first subset of pixel cells of the array of pixel cells of a first image sensor of the plurality of image sensors to generate first image data at a first resolution; enable a second subset of pixel cells of the array of pixel cells of the first image sensor to generate second image data at a second resolution. The first resolution is higher than the second resolution.

In some aspects, the controller is configured to, based on transmitting the control signal: set a first dynamic range of a first subset of pixel cells of the array of pixel cells of a first image sensor of the plurality of image sensors; and set a second dynamic range of a second subset of pixel cells of the array of pixel cells of the first image sensor. The first dynamic range is higher than the second dynamic range.

In some aspects, the control signal identifies pixel cells of the particular subset of the pixel cells in the array of pixel cells for each image sensor of the subset of plurality of image sensors.

In some aspects, the control signal includes a guidance signal. A first image sensor of plurality of image sensors is configured to determine the particular subset of the pixel cells in the array of pixel cells locally based on the guidance signal.

In some aspects, the guidance signal specifies features of an object of interest. The first image sensor is configured to: determine a region of interest including the object of interest based on the guidance signal; and determine the particular subset of the pixel cells in the array of pixel cells based on the region of interest.

In some aspects, the particular subset of the pixel cells in the array of pixel cells is determined based on at least one of: a tracking result of an object of interest, or a movement of the mobile device.

In some aspects, the image data from at least a first image sensor and a second image sensor of the plurality of image sensors are combined. The first image sensor and the second image sensor face different directions.

In some aspects, the image data from at least a first image sensor and a second image sensor of the plurality of image sensors are combined. The first image sensor is configured to capture light of a first frequency range. The second image sensor is configured to capture light of a second frequency range different from the first frequency range.

In some aspects, the physical link comprises at least one of: a bus based on I3C specification, or an optical link.

In one example, a method comprises: transmitting a control signal to configure image sensing operations at a plurality of image sensors of a mobile device; receiving, via a physical link, image data from each image sensor of the subset of the plurality of image sensors, wherein the plurality of image sensors and the physical link form a multi-drop network; combining the image data from the at least a subset of the plurality of image sensors to obtain an extended field of view (FOV) larger than a FOV provided by each image sensor of the subset of image sensors; determining information of a surrounding environment of the mobile device captured within the extended FOV; and providing the information to an application to generate content to be output by the mobile device based on the information.

In some aspects, the method further comprises: based on transmitting the control signal, selecting the subset of the plurality of image sensors to transmit the image data and disable the rest of the plurality of image sensors.

BRIEF DESCRIPTION OF THE DRAWINGS

Illustrative embodiments are described with reference to the following figures.

Figure 1A:
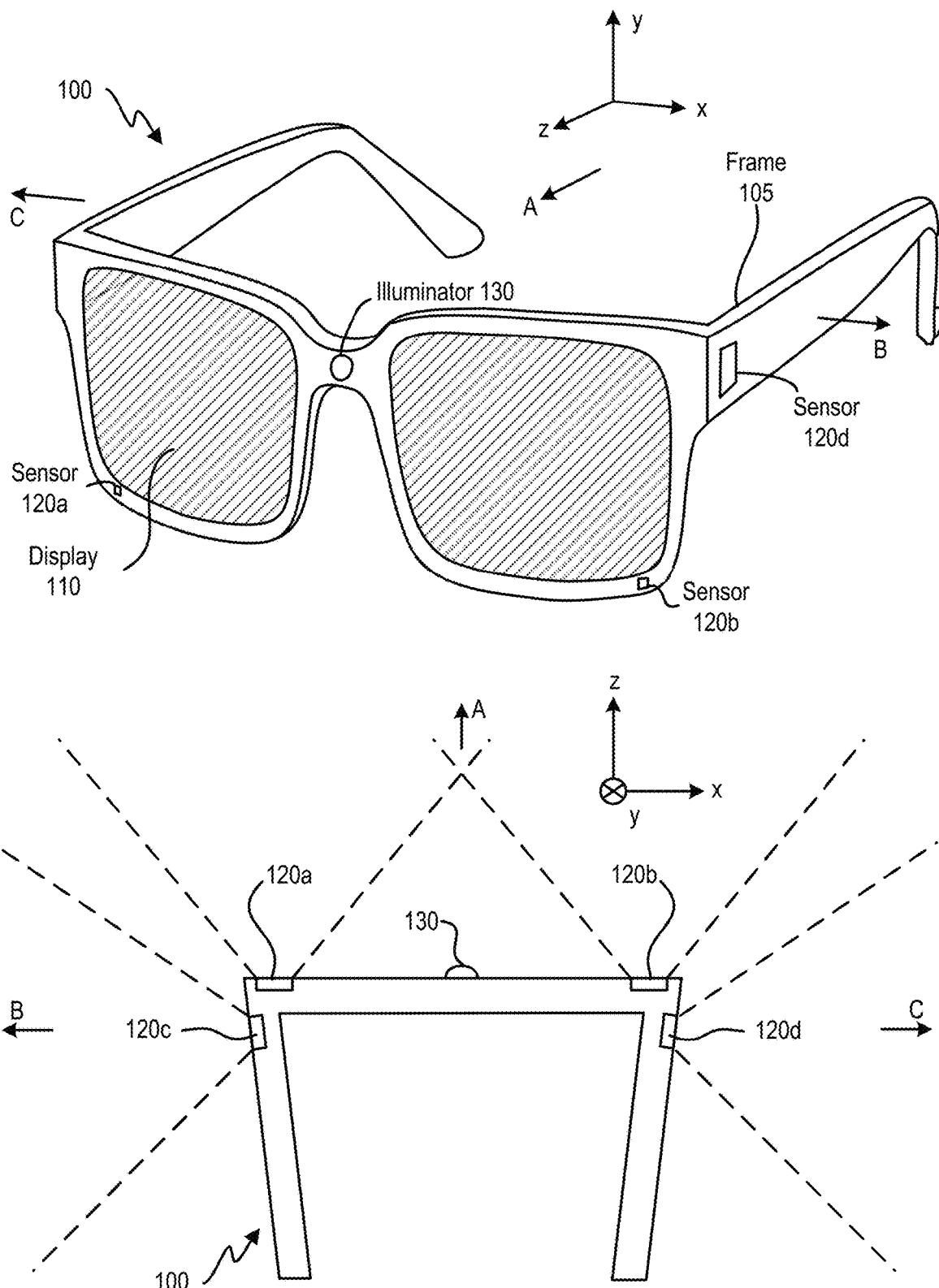
FIG. 1A and FIG. 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles of, or benefits touted in, this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain inventive embodiments. However, it will be apparent that various embodiments may be practiced without these specific details. The figures and description are not intended to be restrictive.

One example according to this disclosure relates to a mobile device, such as a HMD. The mobile device comprises a physical link, a plurality of image sensors each oriented at a particular direction and coupled with the physical link, and a controller coupled with the physical link. The image sensors, the controller, and the physical link can form a multi-drop network, in which each of the plurality of image sensors is configured to capture image data of a surrounding environment of the mobile device, and to transmit the image data via the physical link to the controller. The controller can determine an operation condition (e.g., a location, an orientation, etc.) of the mobile device And, based on the operation condition, the controller can select a subset of the plurality of image sensors, and generate control data based on the selection. The controller can transmit the control data to the subset of the image sensors via the physical link to configure the image capturing operations of the subset of the image sensors. The controller can also receive, via the physical link, first image data captured by the subset of the image sensors based on the control data, and generate an output based on the first image data.

Specifically, the controller can execute an application that determines information about the surrounding environment based on the first image data, and generates content (display content, audio signals, etc.) based on the information. In one example, the application can include a simultaneous localization and mapping (SLAM) algorithm to track, for example, a location of the user of the mobile device, an orientation of the user, and/or a path of movement of the user in the environment. As another example, the application can include a moving object tracking algorithm that tracks a location of a moving object (e.g., a moving hand). Yet in another example, the application can include a scene context understanding algorithm to detect/track objects (e.g., other people who are not within a line of sight of the user). In all these examples, the application can detect certain image features of an object of interest (e.g., an object in the scene, a hand, a person's face, etc.) in the image data and determine their image locations (if detected), and generate the information about the surrounding environment based on the detected image features.

The controller can configure the image capture operations of the image sensors to reduce the volume of image data transmitted over the multi-drop network, while providing the image data needed by the application. For example, the controller can determine that a subset of the image sensors are likely to capture images of one or more objects of interest at a given time based on, for example, detecting features of the objects from prior images captured by those sensors. The controller can then enable the subset of the image sensors to generate and transmit image data while disabling the rest of the image sensors. In a case where an object of interest is moving with respect to the mobile device, the controller can determine a predicted trajectory of movement of the object of interest, and enable different subsets of the image sensors at different times based on the predicted trajectory.

In addition to enabling the subset of the image sensors, the controller can also control the subset of the image sensors to perform sparse sensing operations to further reduce the volume of image data transmitted over the network. Specifically, each image sensor includes an array of pixel cells. For each of the subset of image sensors being enabled, the controller can determine a region of interest (ROI) that is likely to include pixels of the object of interest. In some examples, the controller can control each of the subset of image sensors to enable only a subset of the pixel cells corresponding to the ROI, or to transmit image data from the subset of the pixel cells but not the rest of the pixel cells. In addition, the controller can also configure other aspects of the image capturing operations, such as increasing the quantization resolution, increasing the exposure period, and increasing the dynamic range, etc. of the subset of the pixel cells, to improve the quality of the image data. In some examples, instead of transmitting control data that specify the subset of pixel cells to be enabled at each image sensor, the controller can transmit guidance signals to guide the determination of ROI by the sensor. The guidance signals include information that identify the features of the object of interest, coarse estimates of the location and the size of the ROI, etc. Each image sensor can then determine the ROI locally based on the guidance signal. Such arrangements can reduce the volume of control data transmitted by the controller to the image sensor, as the controller needs not transmit updated ROI information to the image sensor between image frames to account for the movement of the mobile device and/or the object of interest, which can further reduce the power and bandwidth requirement of the network.

The multi-drop network can be implemented using various techniques. In some examples, the multi-drop network can be implemented using a shared bus, such as a bus implemented based on the I3C specification. Specifically, each component coupled with the bus, including the image sensor and the controller, can take turns in driving the bus to sending data via the bus. Each component can also listen to the bus to receive data. Due to the reduced volume of image data and control data, a relatively low-bandwidth and low-power shared bus can be used to transmit the data. In some examples, the multi-drop network can also be implemented using an optical link, where each image sensor and the controller is coupled with the optical link via an optical modulator to transmit and receive data. The image sensors can either take turns in modulating the light in the optical link, or modulate different components of the light simultaneously, to transmit the image data.

With the disclosed examples, a mobile device can include a plurality of image sensors each oriented at a particular direction to capture image data of the surrounding environment. As each image sensor has a FOV aligned at the particular direction, by combining the image data captured by the image sensors, the effective FOV of the mobile device can be extended. Such arrangements can reduce the need for increasing the resolution and FOV of each image sensor, which can take up lots of space and consume lots of power, both of which are very limited in a mobile device. Moreover, by using a multi-drop network, rather than multiple point-to-point interconnects, to transmit image data and control data between the controller and the image sensors, the space required to implement the network, as well as its power consumption, can be further reduced. All these allow the wearable device to provide high quality sensing of the surrounding environment, which in turn can improve the performance of the applications that rely on the outputs of the sensing operations.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infrared light, ultraviolet light, etc.), and can serve various purposes. For example, illuminator 130 may project light in a dark environment (or in an environment with low intensity of infrared light, ultraviolet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate a red-green-blue (RGB) image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
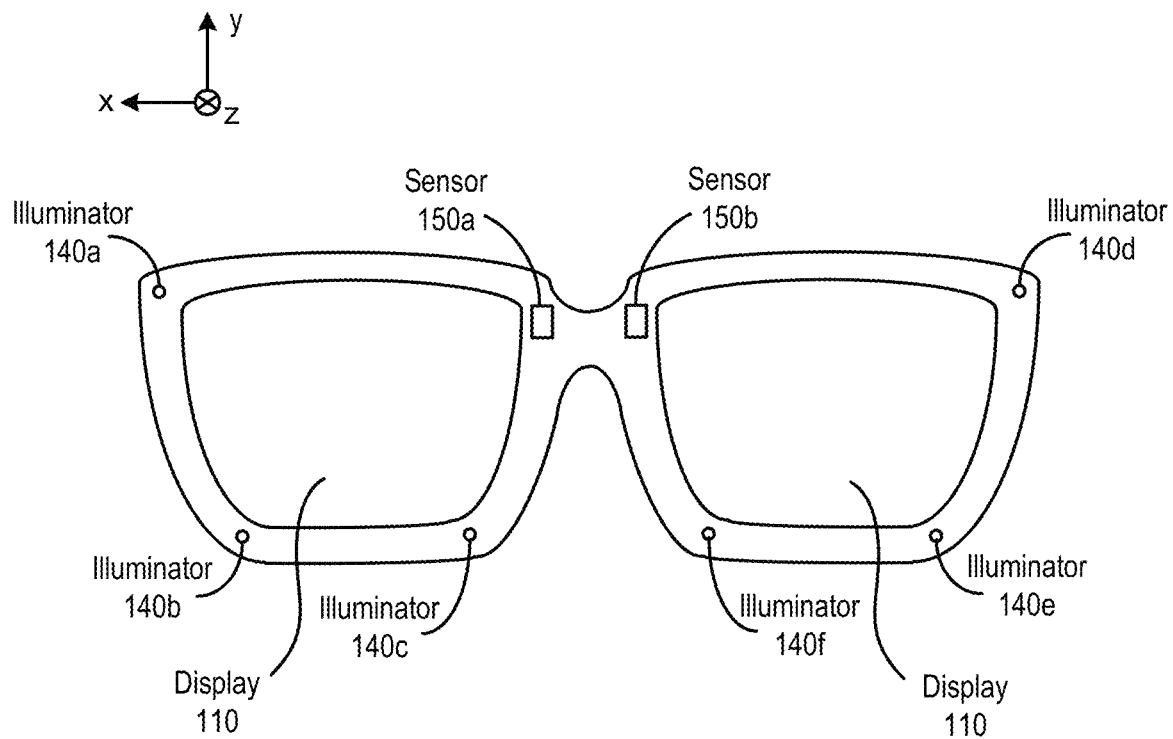

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range, e.g., near-infra-red ("NIR"), towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
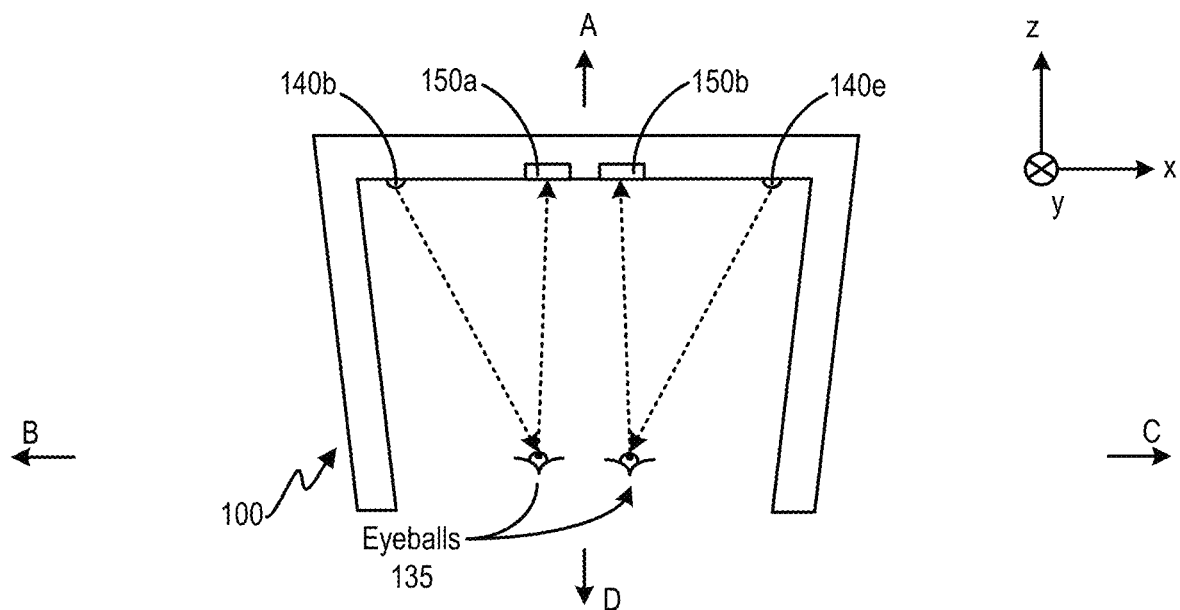
Figure 2:
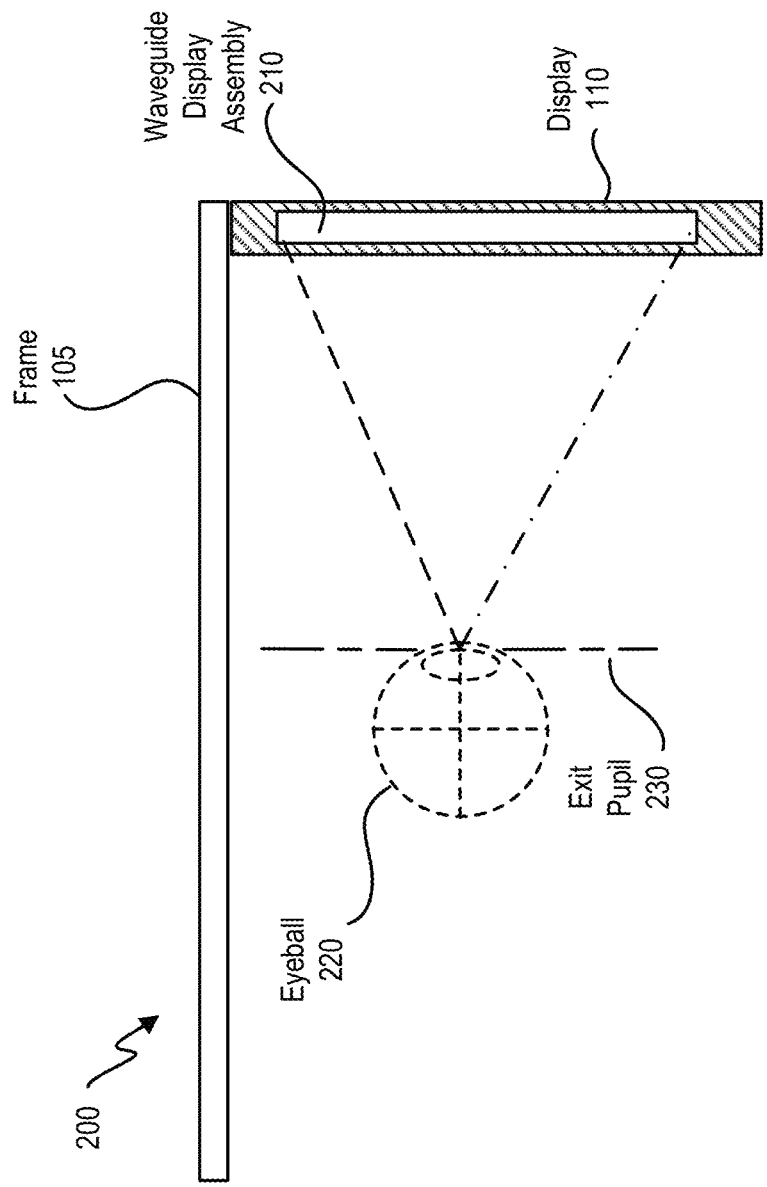
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., an RGB display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
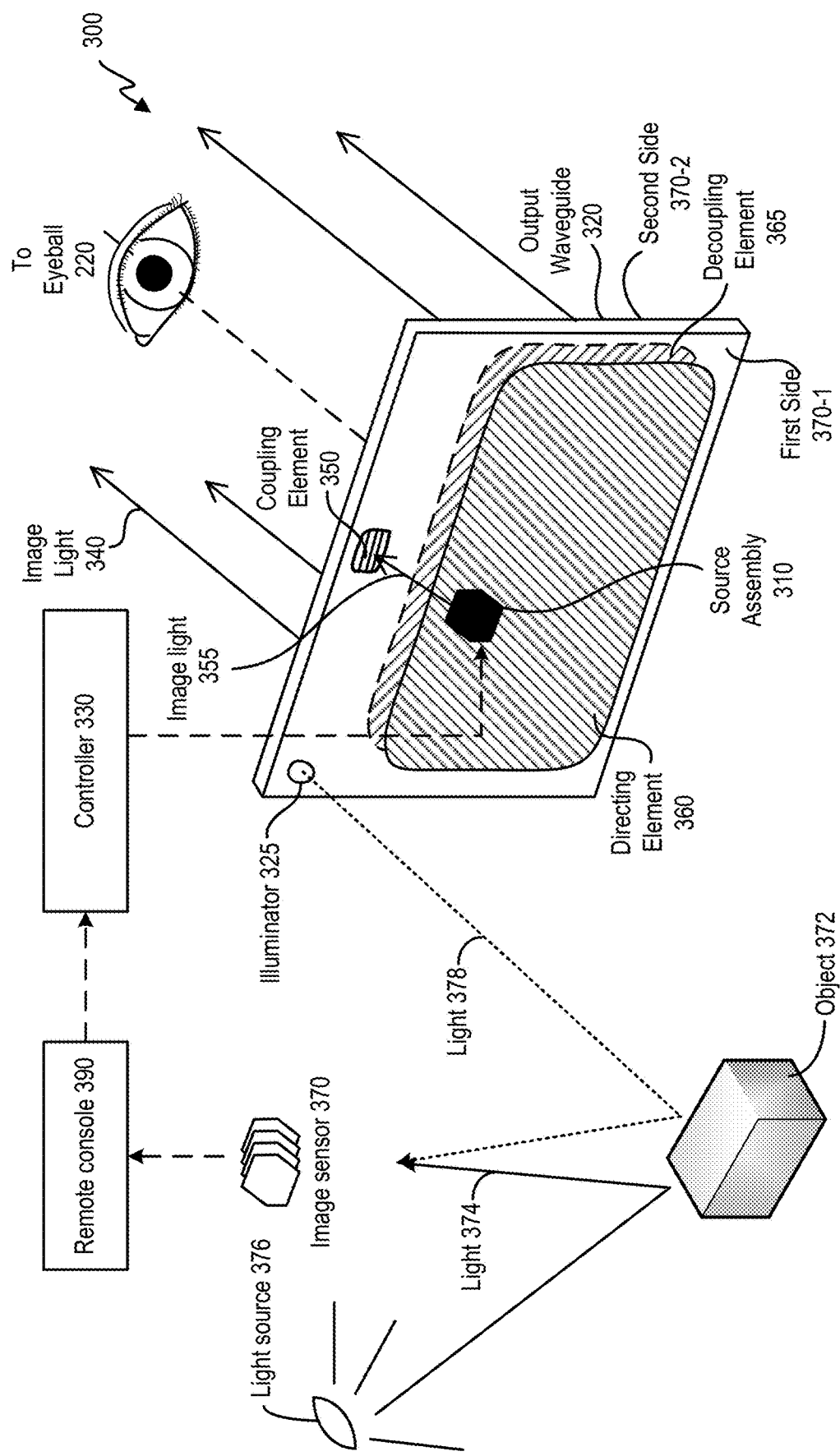
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large FOV. For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A. Image sensors 120a-120d can be operated to perform 2D sensing and 3D sensing of, for example, an object 372 in front of the user (e.g., facing first side 370-1). For 2D sensing, each pixel cell of image sensors 120a-120d can be operated to generate pixel data representing an intensity of light 374 generated by a light source 376 and reflected off object 372. For 3D sensing, each pixel cell of image sensors 120a-120d can be operated to generate pixel data representing a time-of-flight measurement for light 378 generated by illuminator 325. For example, each pixel cell of image sensors 120a-120d can determine a first time when illuminator 325 is enabled to project light 378 and a second time when the pixel cell detects light 378 reflected off object 372. The difference between the first time and the second time can indicate the time-of-flight of light 378 between image sensors 120a-120d and object 372, and the time-of-flight information can be used to determine a distance between image sensors 120a-120d and object 372. Image sensors 120a-120d can be operated to perform 2D and 3D sensing at different times, and provide the 2D and 3D image data to a remote console 390 that may be (or may be not) located within waveguide display 300. The remote console may combine the 2D and 3D images to, for example, generate a 3D model of the environment in which the user is located, to track a location and/or orientation of the user, etc. The remote console may determine the content of the images to be displayed to the user based on the information derived from the 2D and 3D images. The remote console can transmit instructions to controller 330 related to the determined content. Based on the instructions, controller 330 can control the generation and outputting of image light 355 by source assembly 310, to provide an interactive experience to the user.

Figure 4:
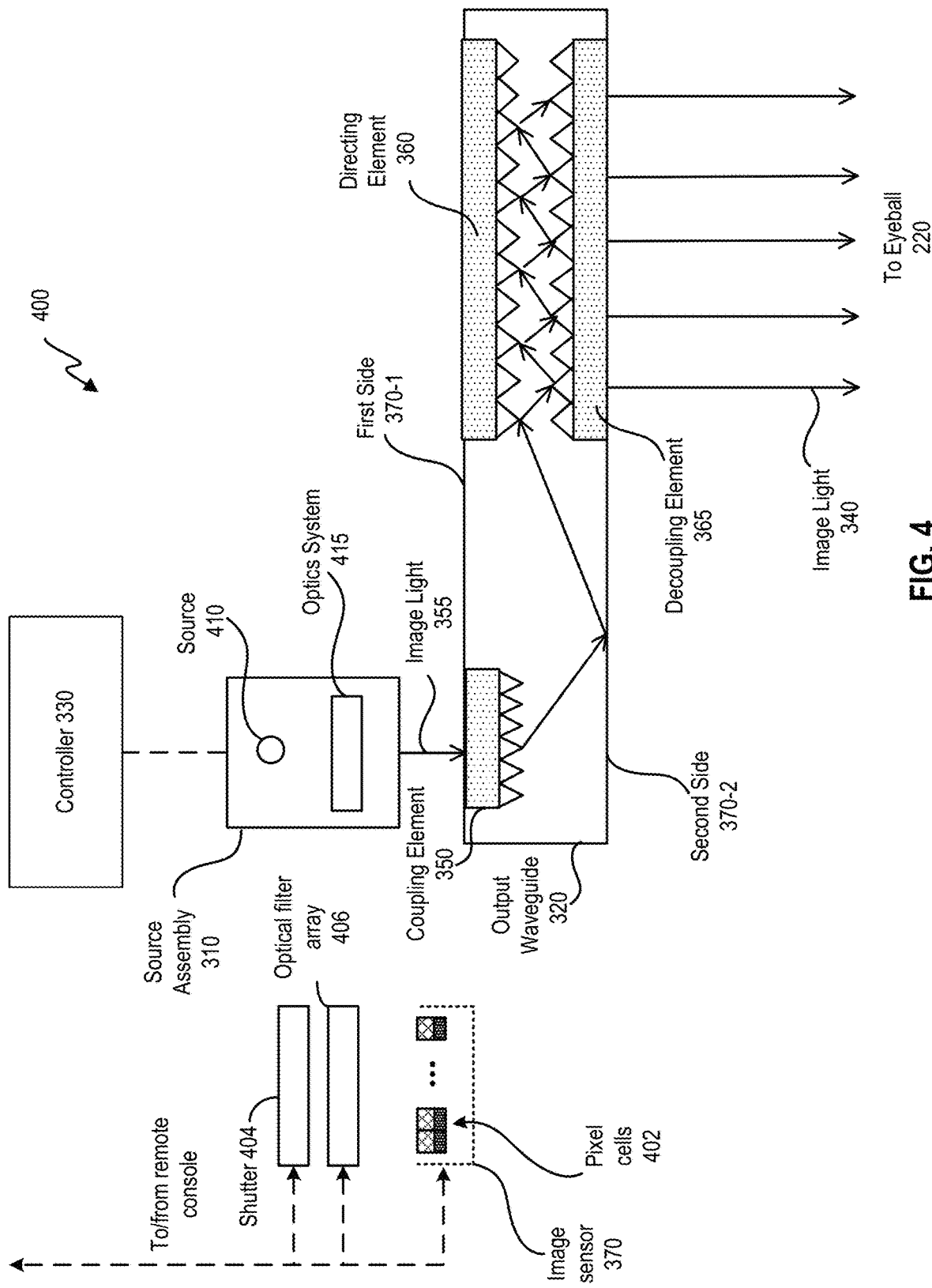
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 and an optical filter array 406 interposed between the set of pixel cells 402 and the physical environment. Mechanical shutter 404 can control the exposure of the set of pixel cells 402. In some embodiments, the mechanical shutter 404 can be replaced by an electronic shutter gate, as to be discussed below. Optical filter array 406 can control an optical wavelength range of light the set of pixel cells 402 is exposed to, as to be discussed below. Each of pixel cells 402 may correspond to one pixel of the image. Although not shown in FIG. 4, it is understood that each of pixel cells 402 may also be overlaid with a filter to control the optical wavelength range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, blue). Each of output waveguides 320 may be stacked together with a distance of separation to output an expanded image light 340 that is multicolored.

Figure 5:
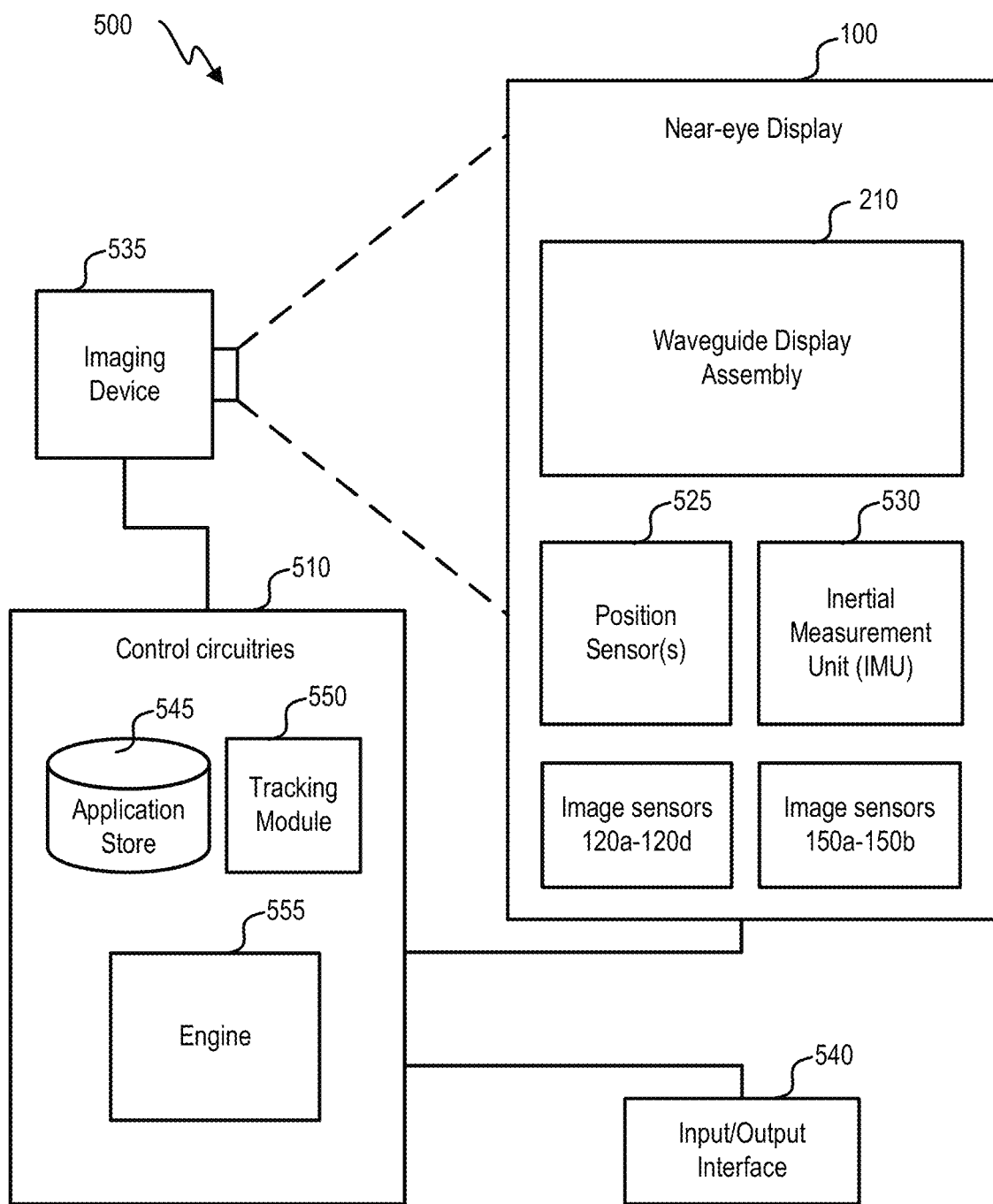
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a mobile device, a wearable device, etc.

Near-eye display 100 is a display that presents media to a user. Examples of media presented by the near-eye display 100 include one or more images, video, and/or audio. In some embodiments, audio is presented via an external device (e.g., speakers, headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
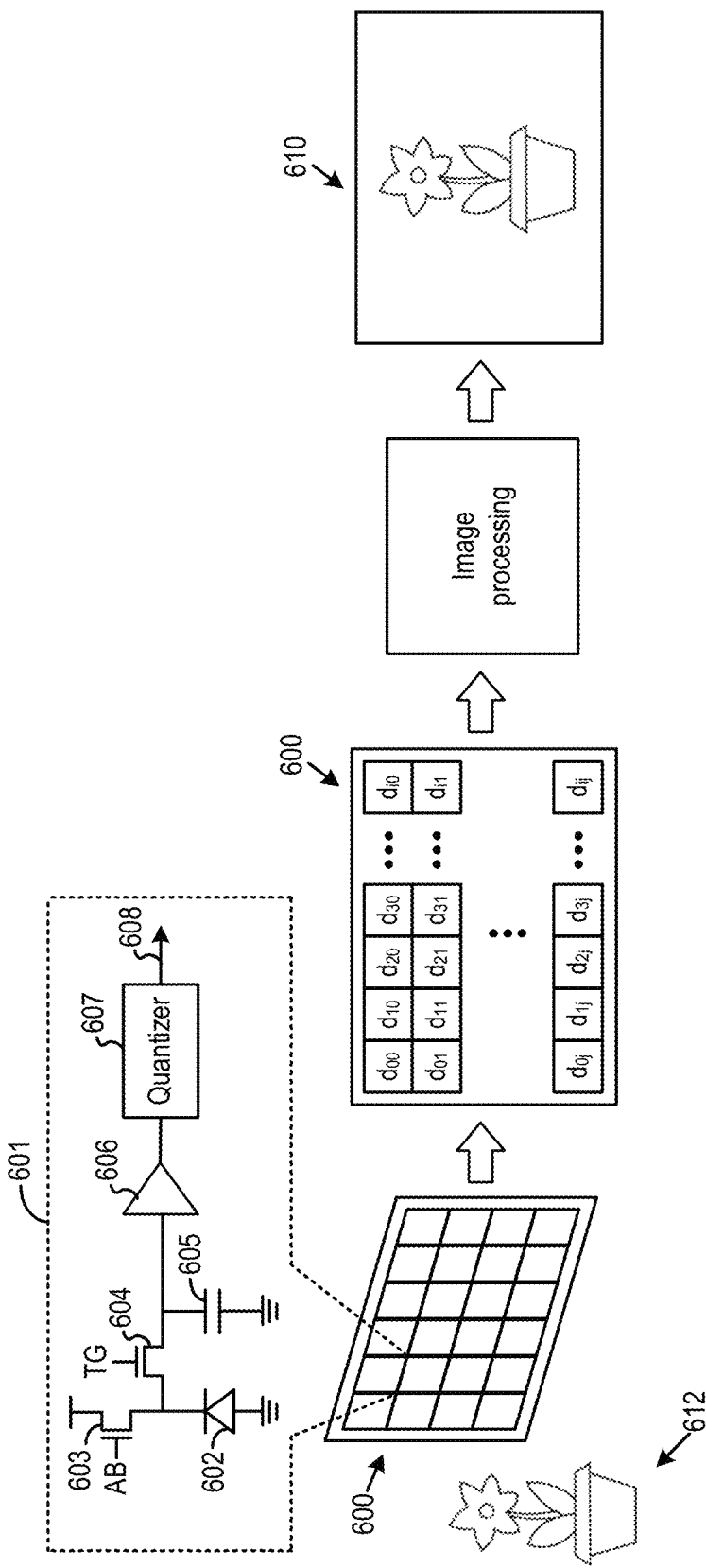
FIG. 6A, FIG. 6B, FIG. 6C, and FIG. 6D illustrate examples of an image sensor and its operations.

FIG. 6A, FIG. 6B, FIG. 6C, and FIG. 6D illustrate examples of an image sensor 600 and its operations. As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include a photodiode 602, an electronic shutter switch 603, a transfer switch 604, a charge storage device 605, a buffer 606, and a quantizer 607. Photodiode 602 may include, for example, a P-N diode, a P-I-N diode, a pinned diode, etc., whereas charge storage device 605 can be a floating drain node of transfer switch 604. Photodiode 602 can generate and accumulate residual charge upon receiving light within an exposure period. Upon saturation by the residual charge within the exposure period, photodiode 602 can output overflow charge to charge storage device 605 via transfer switch 604. Charge storage device 605 can convert the overflow charge to a voltage, which can be buffered by buffer 606. The buffered voltage can be quantized by quantizer 607 to generate measurement data 608 to represent, for example, the intensity of light received by photodiode 602 within the exposure period.

Quantizer 607 may include a comparator to compare the buffered voltage with different thresholds for different quantization operations associated with different intensity ranges. For example, for a high intensity range where the quantity of overflow charge generated by photodiode 602 exceeds a saturation limit of charge storage device 605, quantizer 607 can perform a time-to-saturation (TTS) measurement operation by detecting whether the buffered voltage exceeds a static threshold representing the saturation limit, and if does, measuring the time it takes for the buffered voltage to exceed the static threshold. The measured time can be inversely proportional to the light intensity. Also, for a medium intensity range in which the photodiode is saturated by the residual charge but the overflow charge remains below the saturation limit of charge storage device 605, quantizer 607 can perform a FD ADC operation to measure a quantity of the overflow charge stored in charge storage device 605. Further, for a low intensity range in which the photodiode is not saturated by the residual charge and no overflow charge is accumulated in charge storage device 605, quantizer 607 can perform a PD ADC operation to measure a quantity of the residual charge accumulated in photodiode 602. The output of one of TTS, FD ADC, or PD ADC operation can be output as measurement data 608 to represent the intensity of light.

Figure 6B:
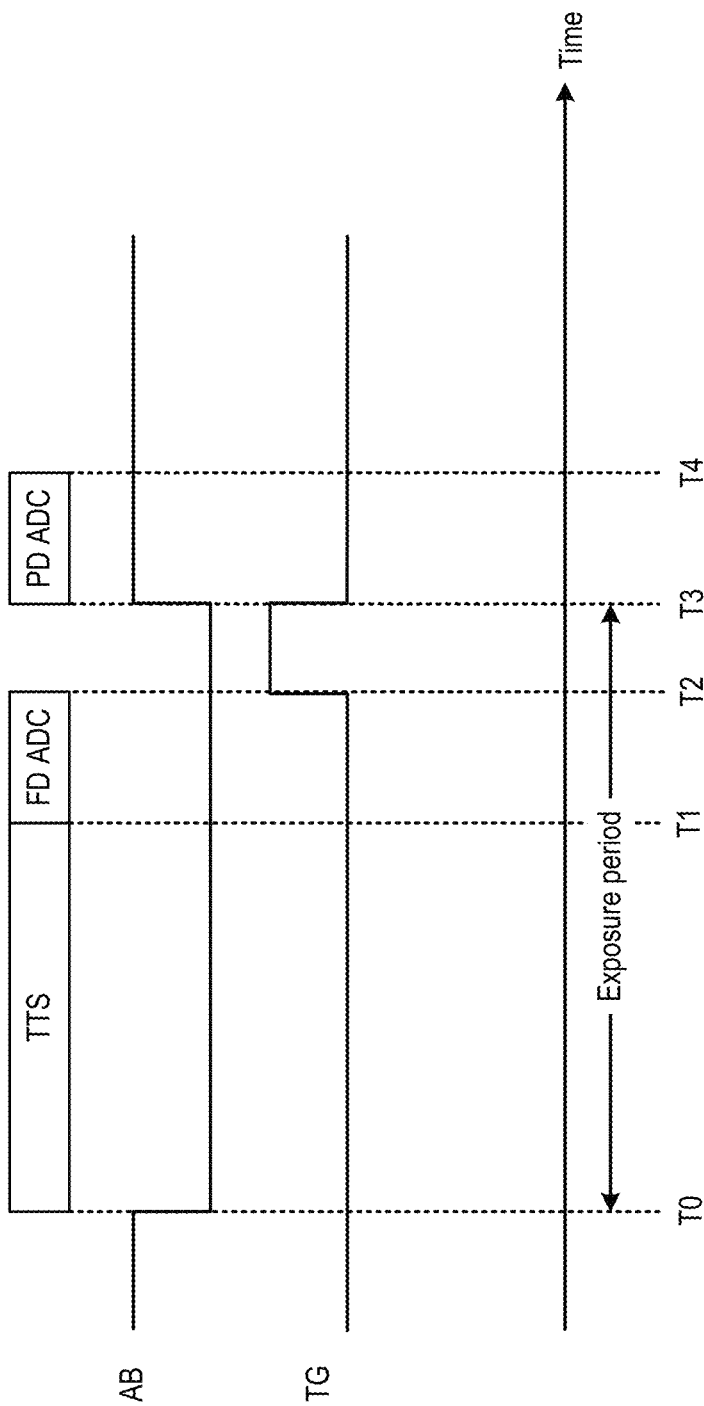
Figure 6C:
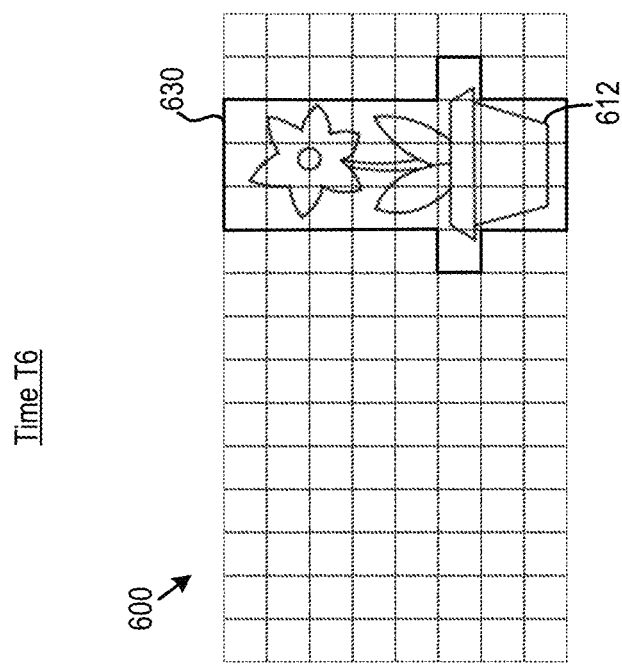
Figure 6C:
Figure 6C:
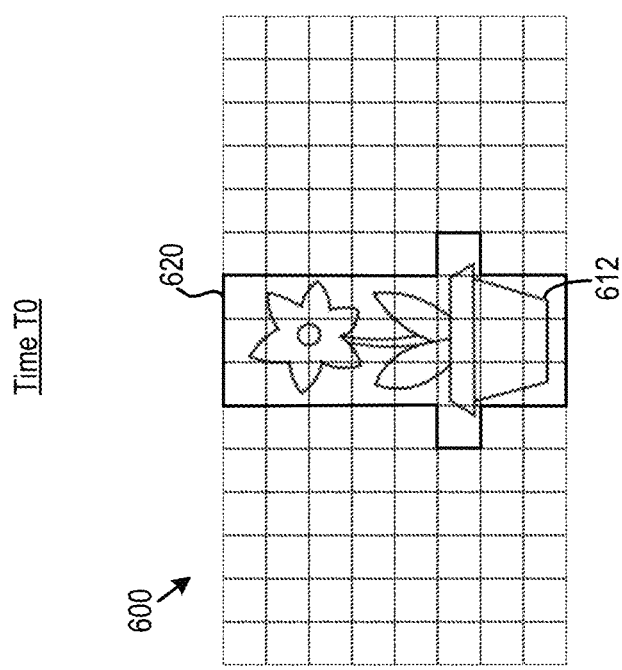
Figure 6D:
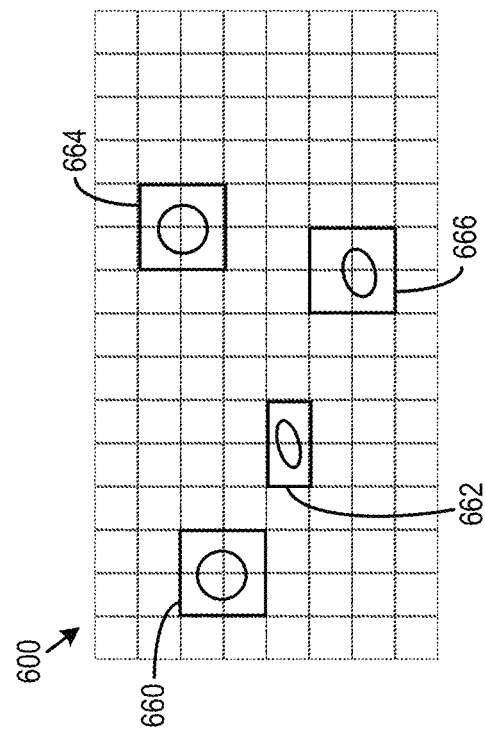
Figure 6D:
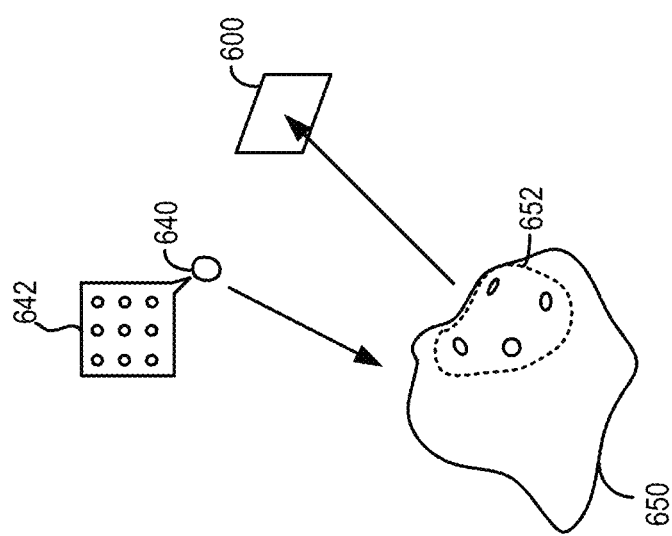

FIG. 6B illustrates an example sequence of operations of pixel cell 601. As shown in FIG. 6B, the exposure period can be defined based on the timing of AB signal controlling electronic shutter switch 603, which can steer the charge generated by photodiode 602 away when enabled, and based on the timing of the TG signal controlling transfer switch 604, which be controlled to transfer the overflow charge and then the residual charge to charge storage device 605 for read out. For example, referring to FIG. 6B, the AB signal can be de-asserted at time T0 to allow photodiode 602 to generate charge. T0 can mark the start of the exposure period. Within the exposure period, the TG signal can set transfer switch 604 at a partially-on state to allow photodiode 602 to accumulate at least some of the charge as residual charge until photodiode 602 saturates, after which overflow charge can be transferred to charge storage device 605. Between times T0 and T1, quantizer 607 can perform a TTS operation to determine whether the overflow charge at charge storage device 605 exceeds the saturation limit, and then between times T1 and T2, quantizer 607 can perform a FD ADC operation to measure a quantity of the overflow charge at charge storage device 605. Between times T2 and T3, the TG signal can be asserted to bias transfer switch 604 in a fully-on state to transfer the residual charge to charge storage device 605. At time T3, the TG signal can be de-asserted to isolate charge storage device 605 from photodiode 602, whereas the AB signal can be asserted to steer charge generated by photodiode 602 away. The time T3 can mark the end of the exposure period. Between times T3 and T4, quantizer 607 can perform a PD operation to measure a quantity of the residual charge.

The AB and TG signals can be generated by a controller (not shown in FIG. 6A) which can be part of pixel cell 601 to control the duration of the exposure period and the sequence of quantization operations. The controller can also detect whether charge storage device 605 is saturated and whether photodiode 602 is saturated to select the outputs from one of the TTS, FD ADC, or PD ADC operations as measurement data 608. For example, if charge storage device 605 is saturated, the controller can provide the TTS output as measurement data 608. If charge storage device 605 is not saturated but photodiode 602 is saturated, the controller can provide the FD ADC output as measurement data 608. If photodiode 602 is not saturated, the controller can provide the PD ADC output as measurement data 608. The measurement data 608 from each pixel cells of image sensor 600 generated within the exposure period can form an image frame. The controller can repeat the sequence of operations in FIG. 6B in subsequent exposure periods to generate subsequent image frames.

The image frame data from image sensor 600 can be transmitted to a host processor (not shown in FIG. 6A-FIG. 6D) to support different applications, such as identifying and tracking object 612, performing depth sensing of object 612 with respect to image sensor 600, etc. For all these applications, only a subset of pixel cells provide relevant information (e.g., pixel data of object 612), whereas the reset of pixel cells do not provide relevant information. For example, referring to FIG. 6C, at time T0 a group of pixel cells 620 of image sensor 600 receive light reflected by object 612, whereas time T6, object 612 may have shifted (e.g., due to a movement of object 612, a movement of image sensor 600, or both), and a group of pixel cells 630 of image sensor 600 receive light reflected by object 612.

In some examples, image sensor 600 can determine a region of interest (ROI) including the pixel data from group of pixel cells 620 (at time T0) and group of pixel cells 630 (at time T6), and transmit only pixel data from the ROI to the host processor to reduce the volume of pixel data being transmitted. In some examples, image sensor 600 can also have all the pixels to transmit pixel data, but pixel cells corresponding to the ROI can have different configurations from pixel cells outside the ROI. For example, groups of pixel cells 620 and 630 can generate and output the pixel data at a higher quantization resolution to represent the image of object 612, while the rest of the pixel cells can generate and output the pixel data at a lower resolution. As another example, groups of pixel cells 620 and 630 can have longer exposure periods than the others. As yet another example, groups of pixel cells 620 and 630 can have wider dynamic range (e.g., based on performing the TTS, FD ADC, and PD ADC operations), while the rest of pixel cells can have a narrower dynamic range (e.g., based on disabling one or more of the TTS, FD ADC, and PD ADC operations). All these arrangements can allow generation and transmission of higher resolution images without corresponding increase in power and bandwidth. For example, a larger pixel cell array including more pixel cells can be used to image object 612 to improve image resolution, while the bandwidth and power required to provide the improved image resolution can be reduced when only a subset of the pixel cells, including the pixel cells that provide pixel data of object 612, generate high quality pixel data and transmit the high resolution pixel data to the host processor, while the rest of the pixel cells are either not generating/transmitting pixel data, or generating/transmitting pixel data at a relatively low quality. Moreover, while image sensor 600 can be operated to generate images at a higher frame rate, the increases in bandwidth and power can be reduced when each image only includes a small set of pixel values that are at high resolution and represented by a large number of bits, while the rest of the pixel values are at very low resolution and are represented by a smaller number of bits.

The volume of pixel data transmission can also be reduced in the case of 3D sensing. For example, referring to FIG. 6D, an illuminator 640 can project a pattern 642 of structured light onto an object 650. The structured light can be reflected on a surface of an object 650, and a pattern 652 of reflected light can be captured by image sensor 600 to generate an image. Host processor can match pattern 652 with pattern 642 and determine the depth of object 650 with respect to image sensor 600 based on the image locations of pattern 652 in the image. For 3D sensing, only groups of pixel cells 660, 662, 664, and 666 contain relevant information (e.g., pixel data of pattern 652). To reduce the volume of pixel data being transmitted, image sensor 600 can be configured to send only the pixel data from ROIs comprising groups of pixel cells 660, 662, 664, and 666, or to send the pixel data from groups of pixel cells 660, 662, 664, and 666 at a high resolution while the rest of the pixel data are at a low resolution, to the host processor.

Figure 7A:
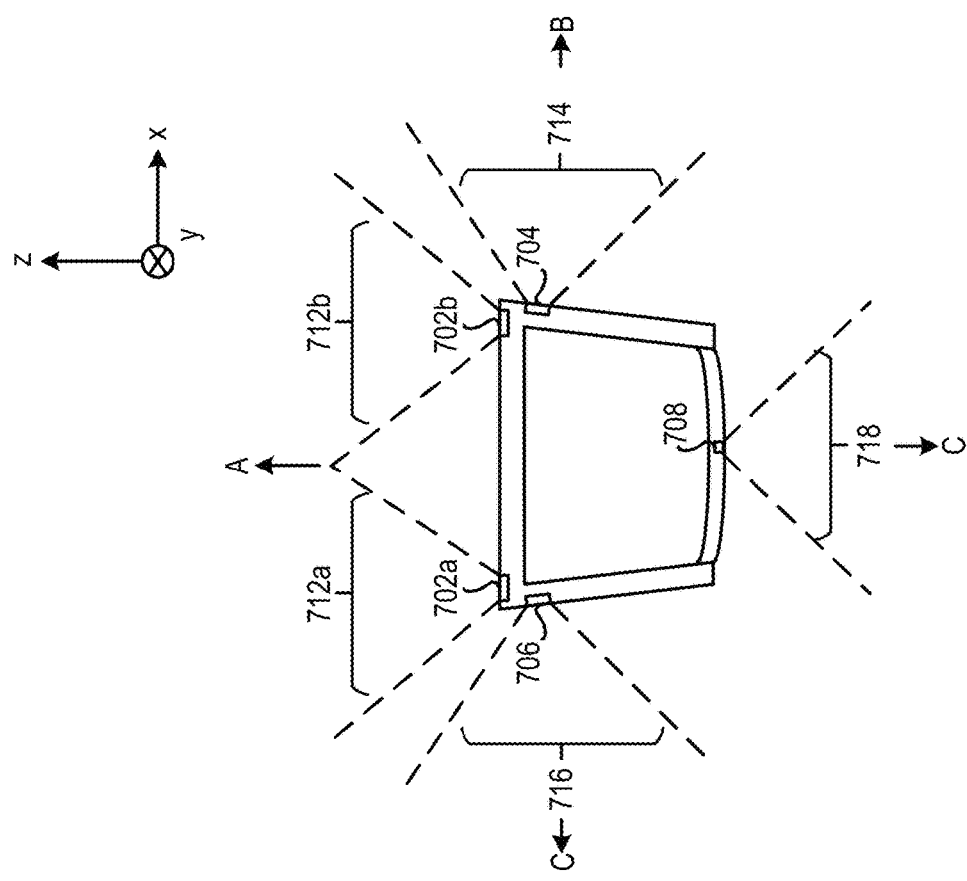
FIG. 7A, FIG. 7B, FIG. 7C, and FIG. 7D illustrate an example of a mobile device having a sensor network and its operations.
Figure 7A:
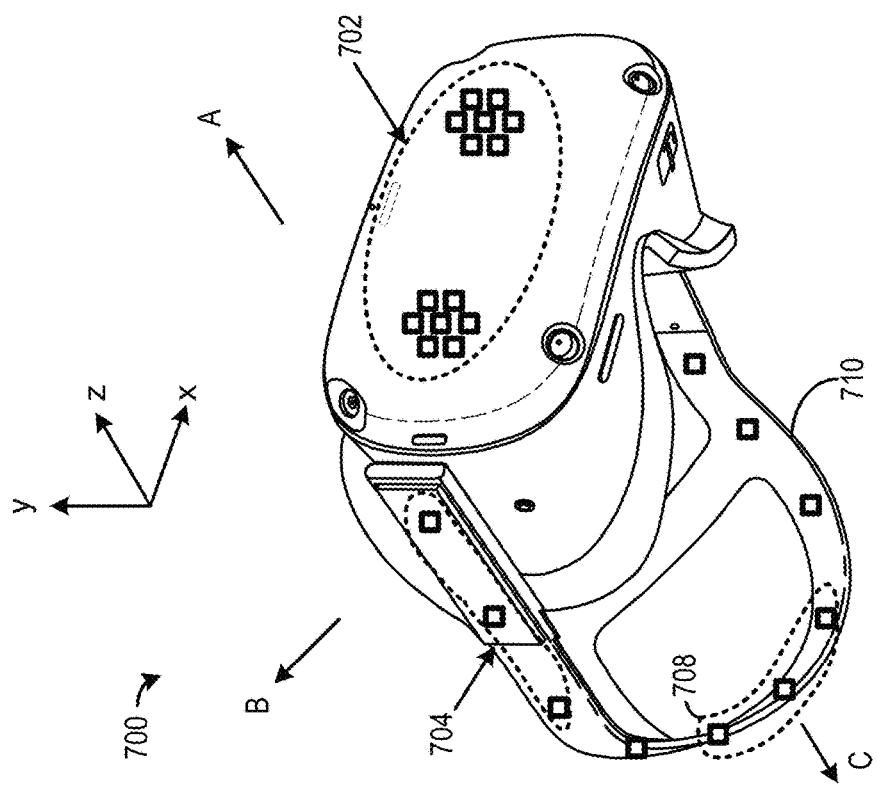

FIG. 7A illustrates examples of a mobile device 700 that includes a plurality of sensors. Mobile device 700 can include near-eye display 100 of FIG. 1A. The left diagram of FIG. 7A illustrates a three-dimensional view of an example of mobile device 700. As shown in the left of FIG. 7A, mobile device 700 can be in the form of a head-mounted display (HMD). A plurality of sensors can be distributed over mobile device 700, with each sensor (or group of sensors) being oriented at a particular direction. For example, sensors 702a and 702b can be positioned on a front surface of mobile device 700 facing towards direction A, sensors 704 can be position on a side surface of mobile device 700 facing towards direction B, sensors 706 can be positioned on another side surface of mobile device 700 facing towards direction C, whereas sensors 708 can be position on a back side of mobile device 700 (e.g., on the headband 710) facing towards direction D.

Each set of sensors 702a, 702b, 704, 706, and 708 can include an image sensor 600 of FIG. 6A including an array of pixel cells, as well as other types of sensors (e.g., audio sensors and motion sensors) and illuminators (e.g., infrared illuminator). Each set of sensors can have a field of view (FOV) facing the respectively direction the set of sensors is facing, and an image captured by each set of sensors can represent a part of the surrounding environment within the respective FOV. For example, sensors 702a and sensors 702b can have, respectively, a FOV 712a and a FOV 712b, both of which face direction A. Moreover, sensors 704 can have a FOV 714 facing direction B, sensors 706 can have a FOV 716 facing direction C, whereas sensors 708 can have a FOV 718 facing direction D. A controller of mobile device 700 can process the images captured by the sensors to obtain information about the surrounding environment, which allows the mobile device to have a combined FOV of the surrounding environment that combines FOVs 712a, 712b, 714, 716, and 718. In a case where the controller processes the images from sensors 702a, 702b, 704, 706, and 708, the controller can obtain images captured from the front side, back side, and two lateral sides of mobile device 700, which can lead to a combined FOV of close to 360 degrees.

In some examples, each set of sensors 702a, 702b, 704, 706, and 708 can have a relatively small array of pixel cells having a relatively low resolution (e.g., fewer than 1 mega pixels). Due to the reduced size of pixel cells array, each set of sensors 702a, 702b, 704, 706, and 708 can have a reduced silicon area and a reduced form factor, which allows the sensors to be distributed at different locations of mobile device 700 where the available space is very limited. On the other hand, as the images from the sensors are combined to combine the FOVs provided by each set of sensors, the mobile device can still provide a wide FOV.

The wide FOV provided by mobile device 700 can enhance the performance of various applications that rely on the image data provided by the image sensors, such as a SLAM operation, a context determination application, a hand-tracking application, etc., all of which can determine the content to be output to the user to provide an interactive AR/VR/MR experience.

Specifically, in an SLAM operation, certain salient features of physical objects in a surrounding environment of a user can be tracked with respect to time as the user moves in the environment. The tracking can be based on identifying a set of features across multiple image frames captured by the image sensors at different times and determining the pixel locations of the features in those image frames. Based on the result of tracking, the locations of the physical objects having the image features with respect to the user can be determined. A map of the environment, as well as locations of the user within the environment at those times, can also be determined. To the make SLAM operation more robust, more salient features can be tracked to reduce the effect of tracking error for a particular feature on the overall accuracy of the SLAM operation. The extended FOV provided by image sensors 702a, 702b, 704, 706, and 708 allow more salient features to tracked to improve the robustness of the SLAM operation.

Figure 7B:
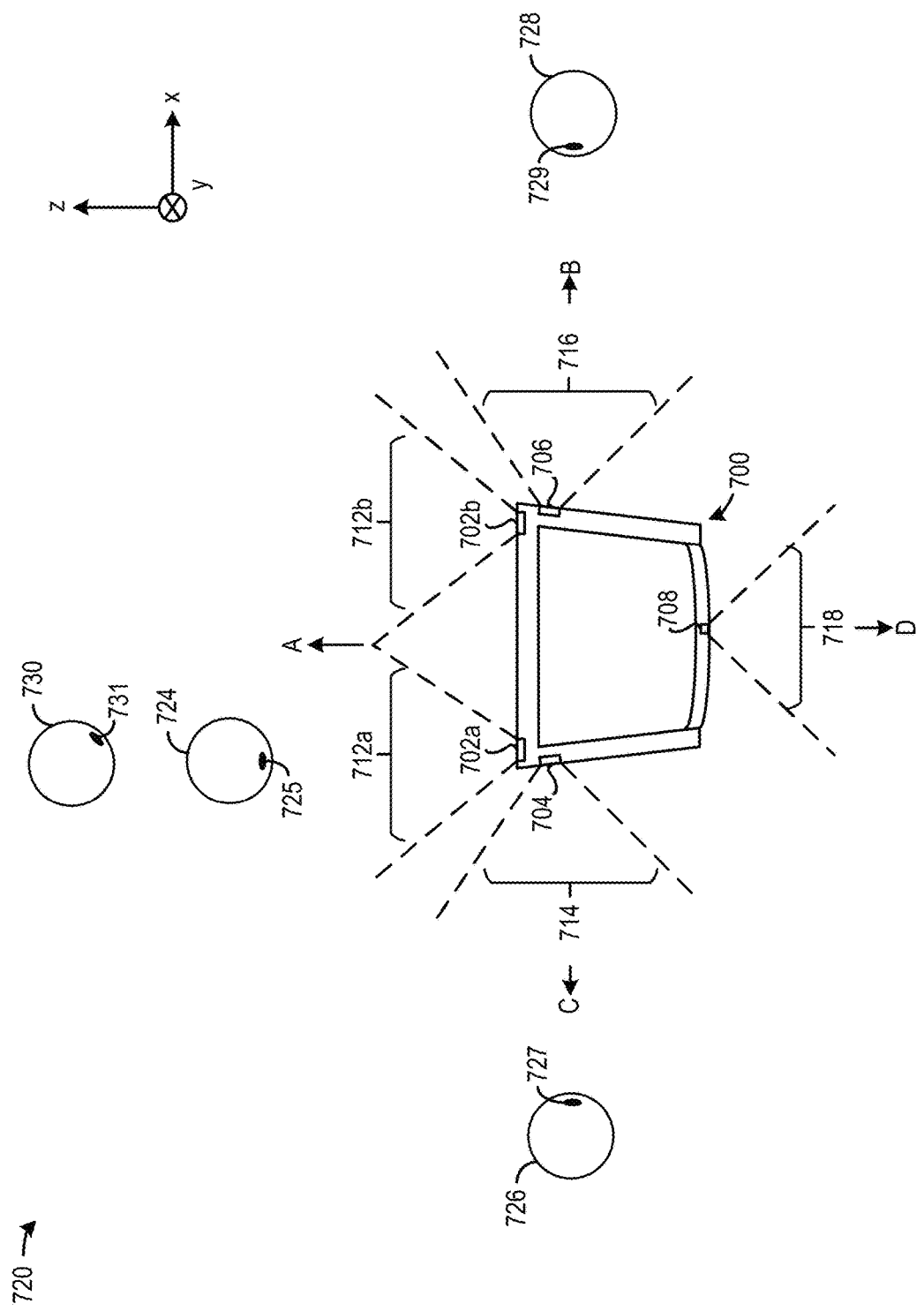

FIG. 7B illustrates an example SLAM operation 720. As shown in FIG. 7B, to support SLAM operation 720, image sensor 702a can capture an image including a physical object 724 and its feature 725 within FOV 712a, image sensor 704 can capture an image including a physical object 726 and its feature 727 within FOV 714, whereas image sensor 706 can capture an image including a physical object 728 and its feature 729 within FOV 716. Compared with a case where mobile device 700 only captures images of physical objects in front of it, the extended FOV provided by the multiple image sensors allow mobile device 700 to capture images of physical objects around the mobile device, which in turns allows tracking of more salient features to make SLAM operation 720 more robust. In some examples, the FOVs of image sensors facing the same direction (e.g., image sensors 702a and 702b) can be combined such that the image sensors form a stereo pair. The image sensors of the stereo pair can detect light within the same frequency ranges (e.g., visible light) or different frequency ranges (e.g., visible light and infra red) to support depth sensing.

In addition, the extended FOV also allows mobile deice 700 to capture features that are otherwise occluded by another physical object. For example, in FIG. 7B, object 724 is positioned between image sensors 702a and object 730 and can occlude feature 731 from image sensors 702a. But feature 731 is also within the FOV of image sensor 702b, which allows feature 731 to be imaged and tracked to improve the robustness of SLAM operation 720.

Figure 7C:
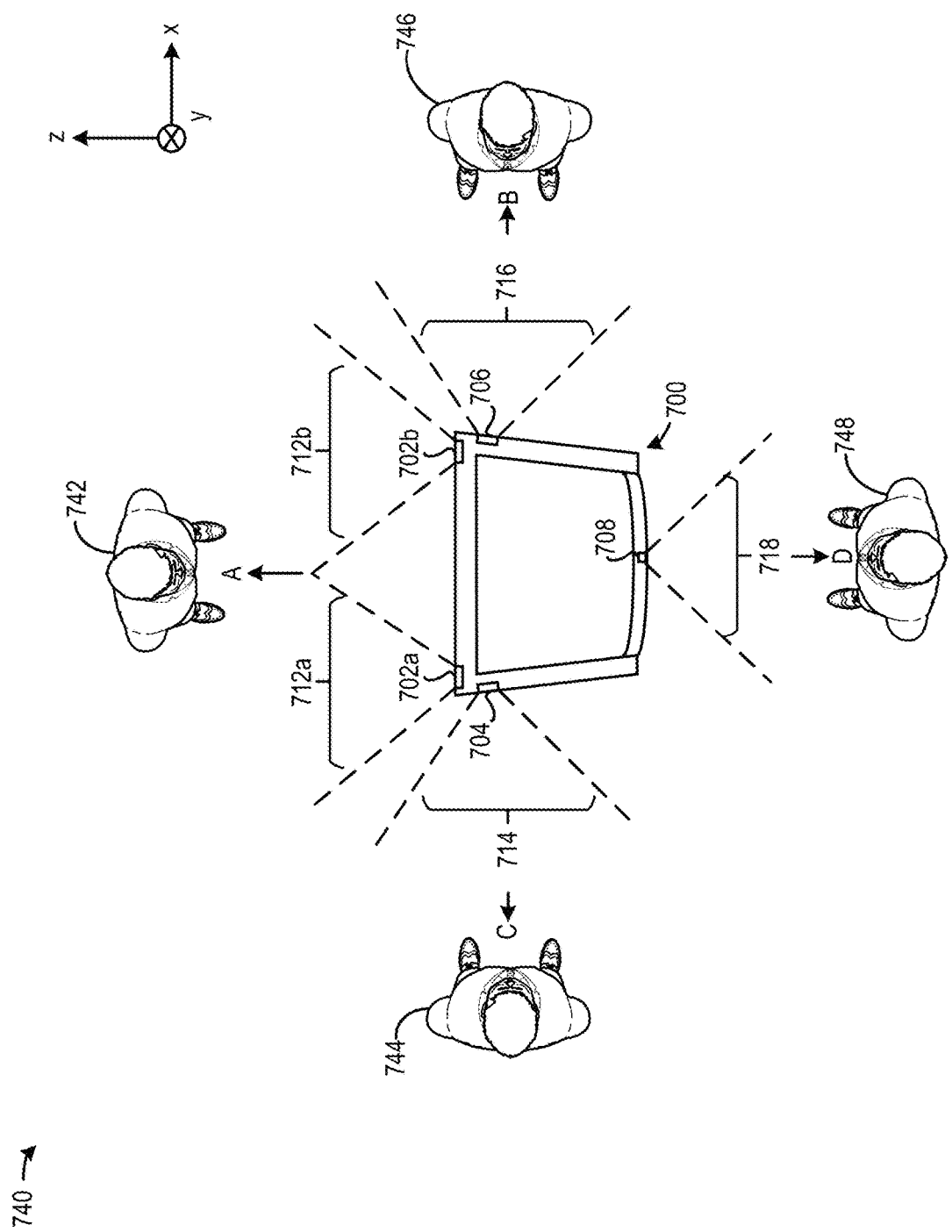

FIG. 7C illustrates an example of a scene context determination operation 740 that can be supported by mobile device 700. The scene context determination allows mobile device 700 to obtain information of scene that is not within the line of sight of a user of the mobile device, and to determine a context of the scene based on the information. Specifically, in FIG. 7C, a user of mobile device 700 interacts with a person 742 standing in front of the user (e.g., in direction A), with person 742 within the line of sight of the user. But there are other people in the scene who are not within the line of sight of the user, including persons 744, 746, and 748. Images of persons 744, 746, and 748 can be captured by, respectively, image sensors 704, 706, and 708. In some examples, mobile device 700 can display the images of persons 744, 746, and 748 to the user, to enable the user to determine the context of a scene. For example, as part of a contextual artificial intelligence (AI) operation, the gestures, facial expressions, or other activities of these people can be determined. In addition, if a person is speaking, the location of the speaker can be determined for directional audio processing. As another example, mobile device 700 can execute a scene context determination application that determines the context based on images of persons 744, 746, and 748. Based on the context, output contents can be generated.

Figure 7D:
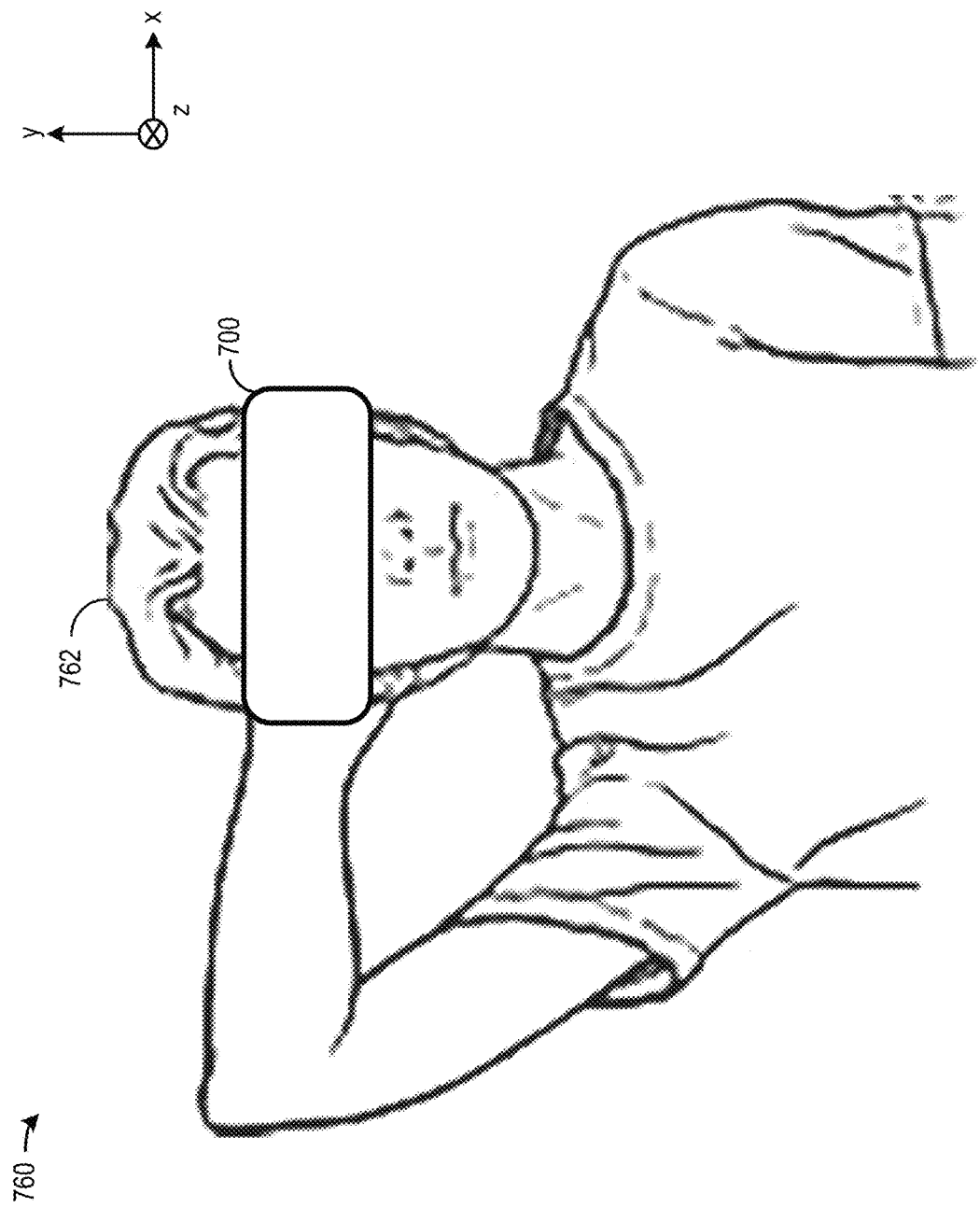

FIG. 7D illustrates an example of an object tracking operation 760 that can be supported by mobile device 700. In FIG. 7D, object tracking operation 760 can be performed to track a location of a hand of user 762 (not shown in FIG. 7D). Due to the different orientations of image sensors 704, 706, and 708, mobile device 700 can capture images of the user's hand at a wide variety of positions, not just in front of user 762 and mobile device 700. For example, mobile device 700 can capture an image of the hand when user 762 moves the hand behind his/her head or body, as shown in FIG. 7D, or when user 762 moves the hand to the side of mobile device 700.

In some examples, the images of the hand captured by image sensors 704, 706 and 708 can be combined to improve the robustness of object tracking operation 760. For example, the controller can control image sensors 704, 706 and 708 to capture an image of the hand at a particular position. In controller can then combine the images to form a stereoscopic image of the user's hand, to improve depth estimation of the hand with respect to user 762. As another example, the controller can also the image captured from one of image sensors 704, 706, or 708 to perform the object tracking. The selection can be based on various criteria. For example, the controller may detect that the images captured by image sensors 704 include certain target features (e.g., a target hand gesture), while such features are less detectable in images from other image sensor, and determine that images from image sensor 704 are to be used to track the object.

Figure 8A:
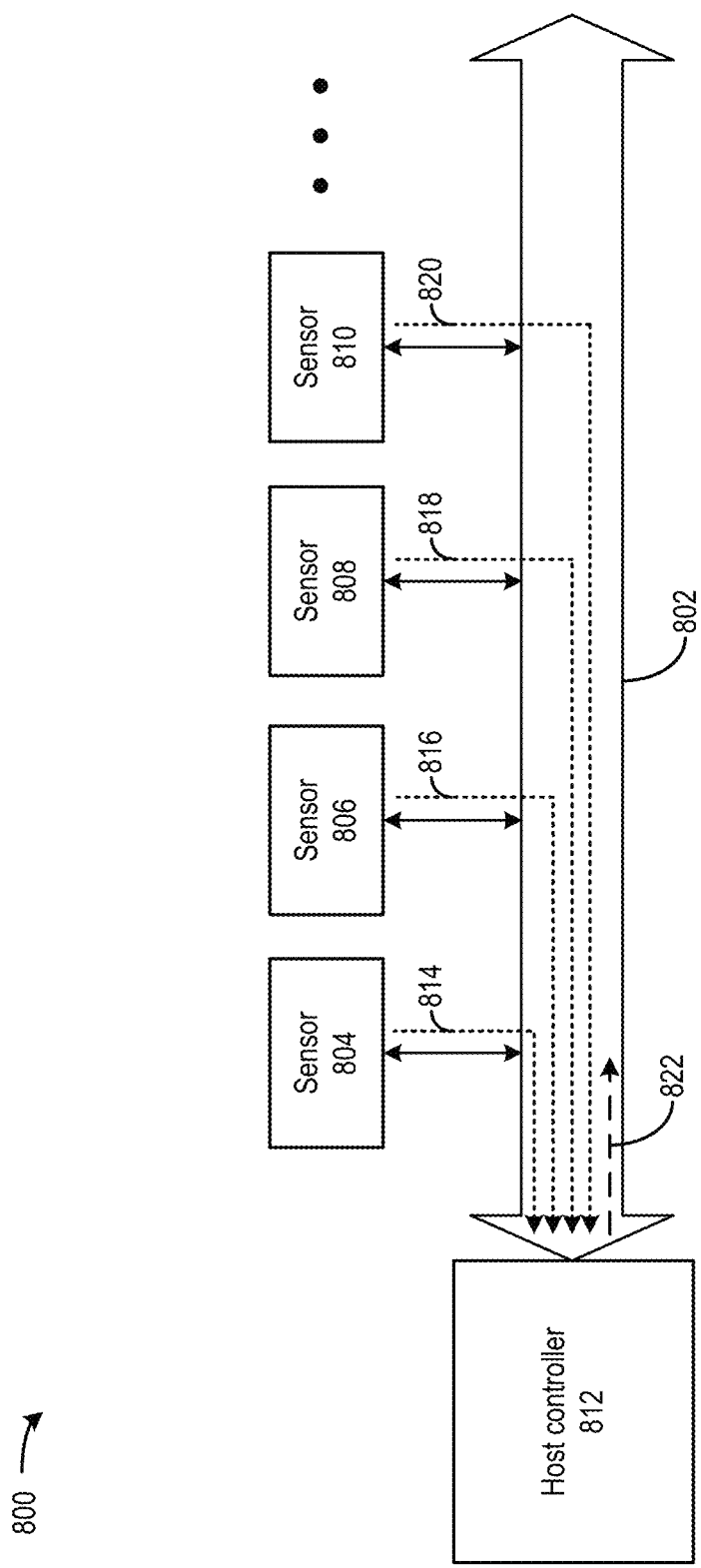
FIG. 8A, FIG. 8B, FIG. 8C, FIG. 8D, and FIG. 8E illustrate examples of a sensor network and of FIG. 7A-FIG. 7D and its operations.

The sensors of mobile device 700, including image sensors 702a, 702b, 704, 706, and 708, as well as the controller, can be connected together by a multi-drop network through which the sensors and the controller communicate. FIG. 8A illustrates an example of a sensor network 800 that can be part of mobile device 700. As shown in FIG. 8A, sensor network 800 can include a physical link 802. Sensor network 800 further includes a plurality of sensors including 804, 806, 808, and 810, etc., and a host controller 812, each of which is coupled with physical link 802. Sensors 804, 806, 808, and 810 may include, for example, image sensors 702, 704, 706, and 708 of FIG. 7A, audio sensors, and motion sensors. Host controller 812 can control the sensing operations at sensors 804, 806, 808, and 810 and process the sensor data obtained by the sensors to support an application, such as SLAM operation 720, scene context determination operation 740, and object tracking operation 760. For example, host controller 812 can combine the image data generated by sensors 804, 806, 808, and 810 to provide an extended FOV of a surrounding environment of mobile device 700.

Sensor network 800 can be in the form of a multi-drop network in which sensors 804-810 and host controller 812 uses the same physical link 802 to communicate with each other. For example, each of sensors 804, 806, 808, and 810 can generate, respectively, sensor data 814, 816, 818, and 820, and transmit the sensor data to host controller 812 via physical link 802. Sensor data 814, 816, 818, and 820 can include, for example, image data, audio data, and motion data. In addition, host controller 812 can generate control data 822 to control the sensing operations at sensors 804-810, and transmit control data 822 to the sensors via physical link 802.

Figure 8B:
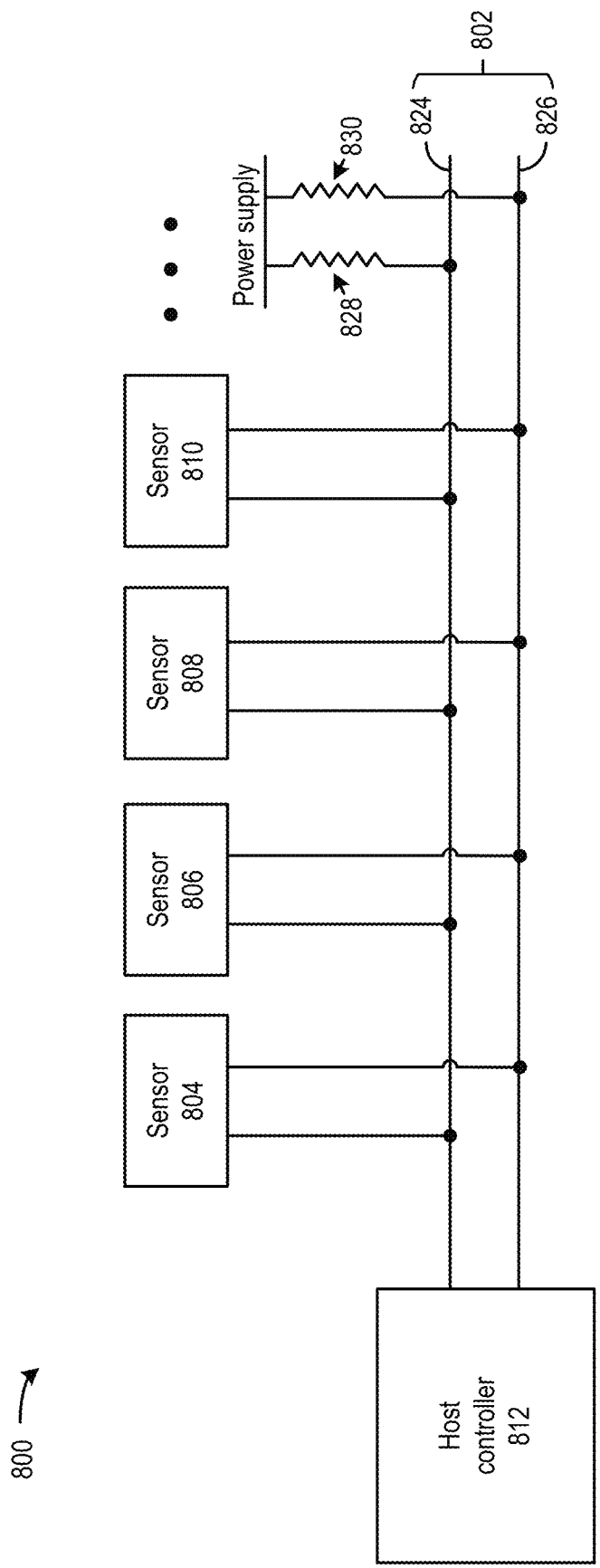

Physical link 802 can be implemented using various techniques. FIG. 8B illustrates an example of physical link 802. In FIG. 8B, physical link 802 can include a bus, which can be configured based on the I2C or the I3C specification and include a serial data line (SDL) 824 and a serial clock line (SCL) 826. Each of SDL 824 and SCL 826 is configured as an open-drain line coupled with, respectively, pull up resistors 828 and 830. When the SDL and SCL lines are not driven, they can be pulled up to a power supply voltage by the pull-up resistors. In the I2C/I3C specification, a master node generates a clock and initiates communication with slave nodes, whereas a slave node receives the clock and responds when addressed by the master. In sensor network 800, host controller 812 is configured as the master node, whereas sensors 804-810 are configured as the slave nodes. To transmit control data 822, host controller 812 can pull down SCL 826 based on a clock signal pattern, and pull down SDL 824 based on a serial data pattern including control data 822 and an address of the target sensor(s). The target sensor(s) can then drive another serial data pattern including sensor data on SDL 824. As the sensors share the same SDL 824, only one of the sensors can transmit sensor data to host controller 812 via SDL 824 at a time. The timing of transmission of sensor data by each sensor can be controlled by host controller 812 via control data 822, defined based on a predetermined transmission schedule, and/or based on back-off delays when multiple sensors attempt to drive SDL 824 simultaneously.

Figure 8C:
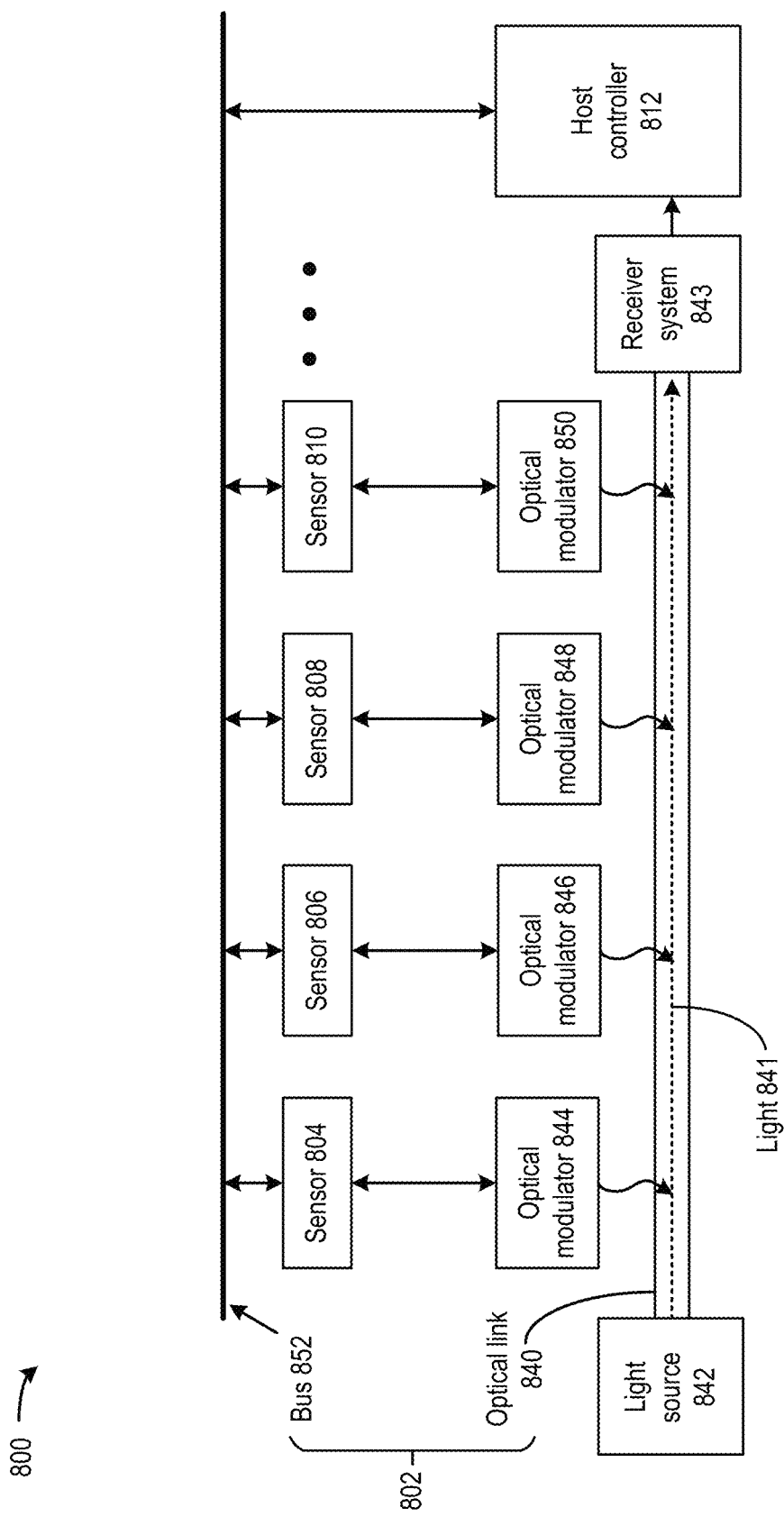

FIG. 8C illustrates another example of physical link 802. As shown in FIG. 8C, physical link 802 can include an optical link 840, which can transmit light 841 from light source 842 to a receiver system 843, which is coupled with host controller 812. Optical link 840 can include a fiber optic, a waveguide, or any medium that propagates light. Each of sensors 804, 806, 808, and 810 can be coupled with optical link 840 via, respectively, optical modulators 844, 846, 848, and 850. To transmit sensor data to host controller 812, each sensor can control its respective optical modulator to modulate light 841. Receiver system 843 can include a light detector (e.g., a photodiode) to convert modulated light 841 to electrical signals, which can be received and processed by host controller 812 to obtain the sensor data. In some examples, the sensors can modulate light 841 based on a time-division multiplexing scheme in which each sensor takes turn in modulating light 841 to transmit sensor data to host controller 812. In some examples, the sensors can also modulate different frequency components of light 841 simultaneously in a frequency-division multiplexing scheme. In addition, host controller 812 and each sensor can be coupled with a bus 852 through which host controller 812 can transmit control data 822. Bus 852 can include an I2C bus, an I3C bus, or other bus technologies. As such, optical link 840 and bus 852 can be combined to provide physical link 802.

Figure 8D:
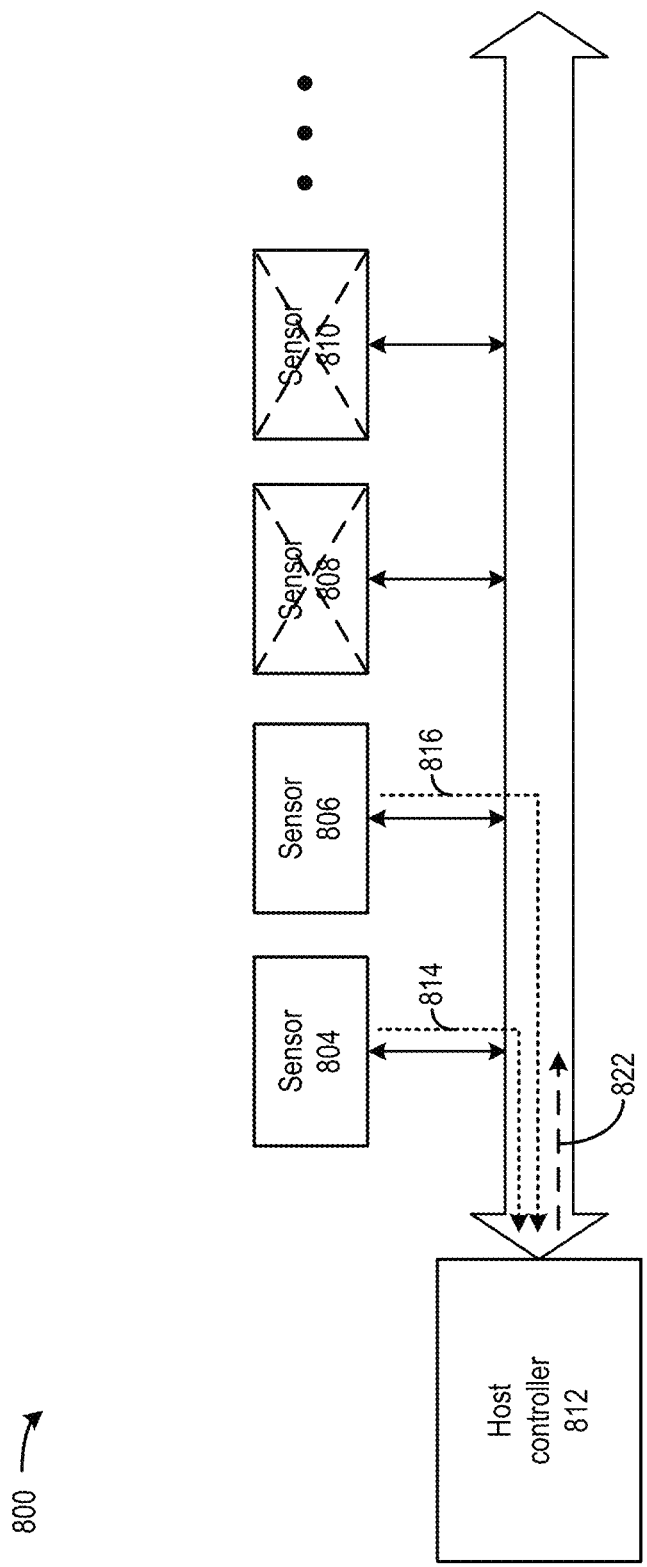

In some examples, to reduce the volume of image data transmitted over physical link 802, which can reduce power and bandwidth of physical link 802, host controller 812 can configure the image capture operations of sensors 804-810 to reduce the volume of image data transmitted over physical link 802, while providing the image data needed by the application. FIG. 8D illustrates an example configuration of sensors 804-810. As shown in FIG. 8D, host controller 812 can select a subset of sensors, including sensors 804 and 806, to transmit sensor data 814 and 816 via physical link 802, while sensors that are not selected (e.g., sensors 808 and 810) are disabled or otherwise not allowed to transmit sensor data via physical link 802. In some examples, host controller 812 can select the subset of sensors to transmit image data at a higher resolution and/or at a higher frame rate, whereas the sensors that are not selected can transmit image data at a lower resolution and/or at a lower frame rate.

There are various ways by which host controller 812 select the subset of sensors. For example, host controller 812 can determine that the subset of sensors are likely to capture images of an object of interest (e.g., user's hand, other physical objects for location tracking) at a given time based on, for example, detecting features of the object from prior images captured by those sensors. In a case where the object of interest is moving with respect to mobile device 700, host controller 812 can determine a predicted trajectory of movement of the object with respect to mobile device 700. Based on the predicted trajectory of movement, host controller 812 can determine which of the sensors are likely to capture images of the object at a given time, and enable different subsets of the image sensors at different times. The predicted trajectory can be based on, for example, pixel locations of the object in prior and most recent images captured by the sensors with respect to time, as well as prior and recent locations and/or orientations of mobile device 700. For example, based on detecting that the user's head (and mobile device 700) is rotating to view a flying object, host controller 812 can predict the trajectory of the flying object with respect to the sensors of mobile device 700, and determine subsets of sensors that are mostly likely to capture images of the flying object at different time points as the user continue to rotate his/her head. Host controller 812 can then enable the subsets of sensors while disabling the rest of the sensors at those time points, to reduce the volume of image data being transmitted over physical link 802. Host controller 812 can also apply similar techniques to selectively enable/disable the transmission of other types of sensor data, such as audio data.

Figure 8E:
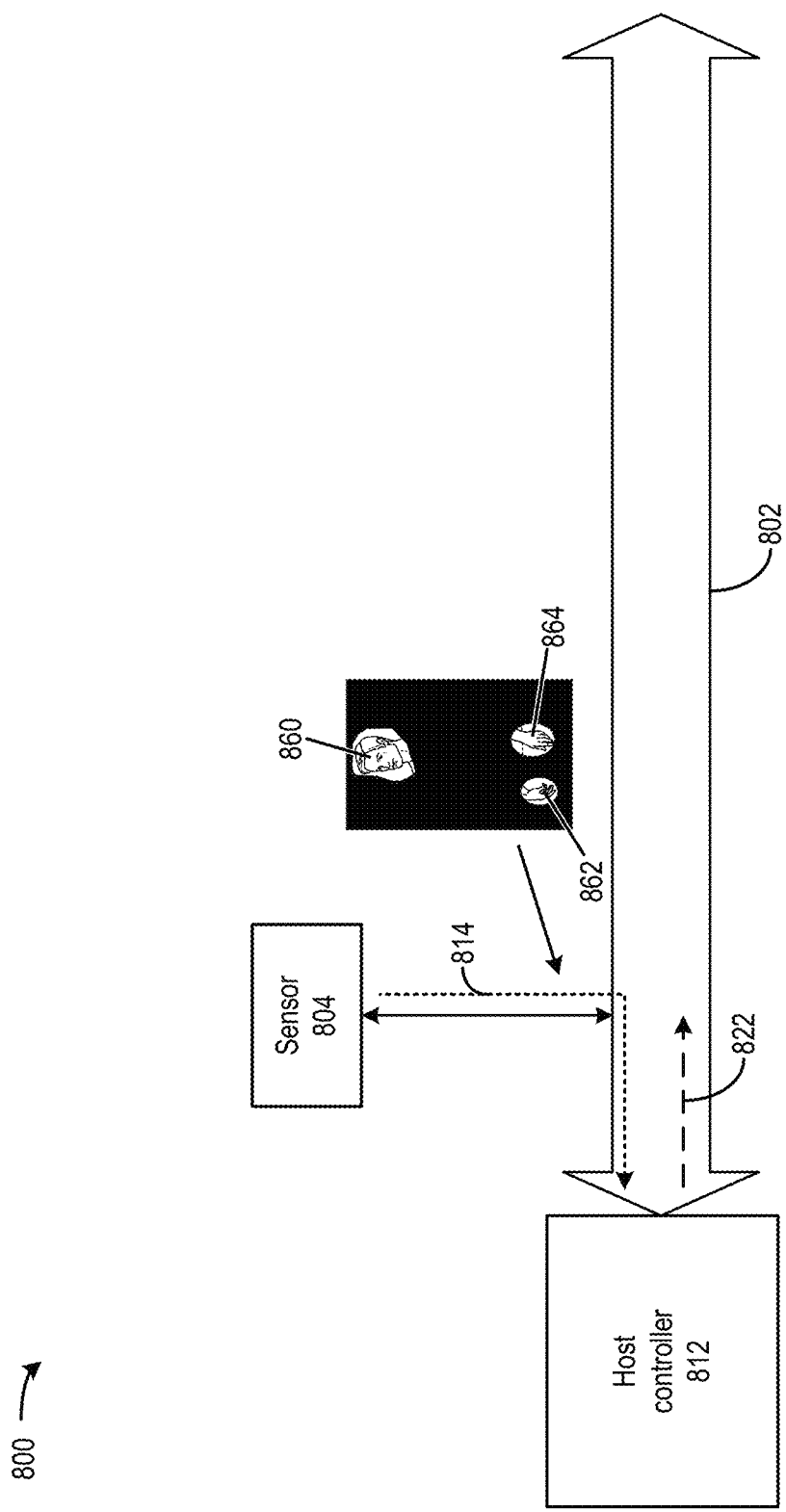

FIG. 8E illustrates another example configuration of sensors 804-810. As shown in FIG. 8E, host controller 812 can control sensors 804-810, or a subset of them selected as described above (e.g., sensor 804), to perform sparse sensing operations to further reduce the volume of image data transmitted over the network. Specifically, host controller 812 can determine, for each sensor enabled to transmit image data, an ROI that is likely to generate pixel data of the object of interest, as described in FIG. 6C and FIG. 6D. The determination of the ROI can be based on, for example, detecting features of the object of interest from prior images captured by those sensors, predicting trajectory of movement of the object with respect to mobile device 700, as described above in FIG. 8D. In FIG. 8E, host controller 812 can determine ROIs 860, 862, and 864 which include pixels of a person's head and hands. Host controller 812 can then control sensor 804 to enable only subsets of the pixel cells corresponding to ROI 860, 862, and 864 to detect light and/or to transmit pixel data, while the rest of the pixels of sensor 804 do not transmit pixel data. As a result, sensor data 814 only include pixels within ROI 860, 862, and 864.

Besides sparse sensing, host controller 812 can also change other aspects of the image capturing operations between pixel cells that belong to the ROI and pixel cells that do not belong to the ROI. For example, host controller 812 can increase the quantization resolution, increase the exposure period, the dynamic range, etc., of the pixel cells that belong to the ROI with respect to other pixel cells, as described above in FIG. 6C and FIG. 6D, to improve the quality of the image data.

There are various ways by which host controller 812 can provide the ROI information to the sensors. For example, control data 822 can include a programming map that specifies the pixel cells (or blocks of pixel cells) that are part of the ROI for each image frame. Host controller 812 can transmit updated control data 822 including updated ROI for different image frames, in a case where the object of interest is moving with respect to mobile device 700. In another example, the sensors can include certain compute capabilities to determine the ROI locally, and host controller 812 can transmit, as part of control data 822, guidance signal to the sensors to guide the determination of ROI at the sensors. The guidance signal may include information that identify the features of object of interests, coarse estimates of the location and the sizes of the ROI, etc. Based on the guidance data, the sensors can determine the ROI based on detecting the specified features, refining the estimates of the ROI, etc. With such arrangements, the volume of control data transmitted by host controller 812 to the sensors can be reduced, as the controller needs not transmit updated ROI information to the sensors between image frames to account for the movement of the mobile device and/or the object of interest, which can further reduce the power and bandwidth requirement of the network.

Figure 9A:
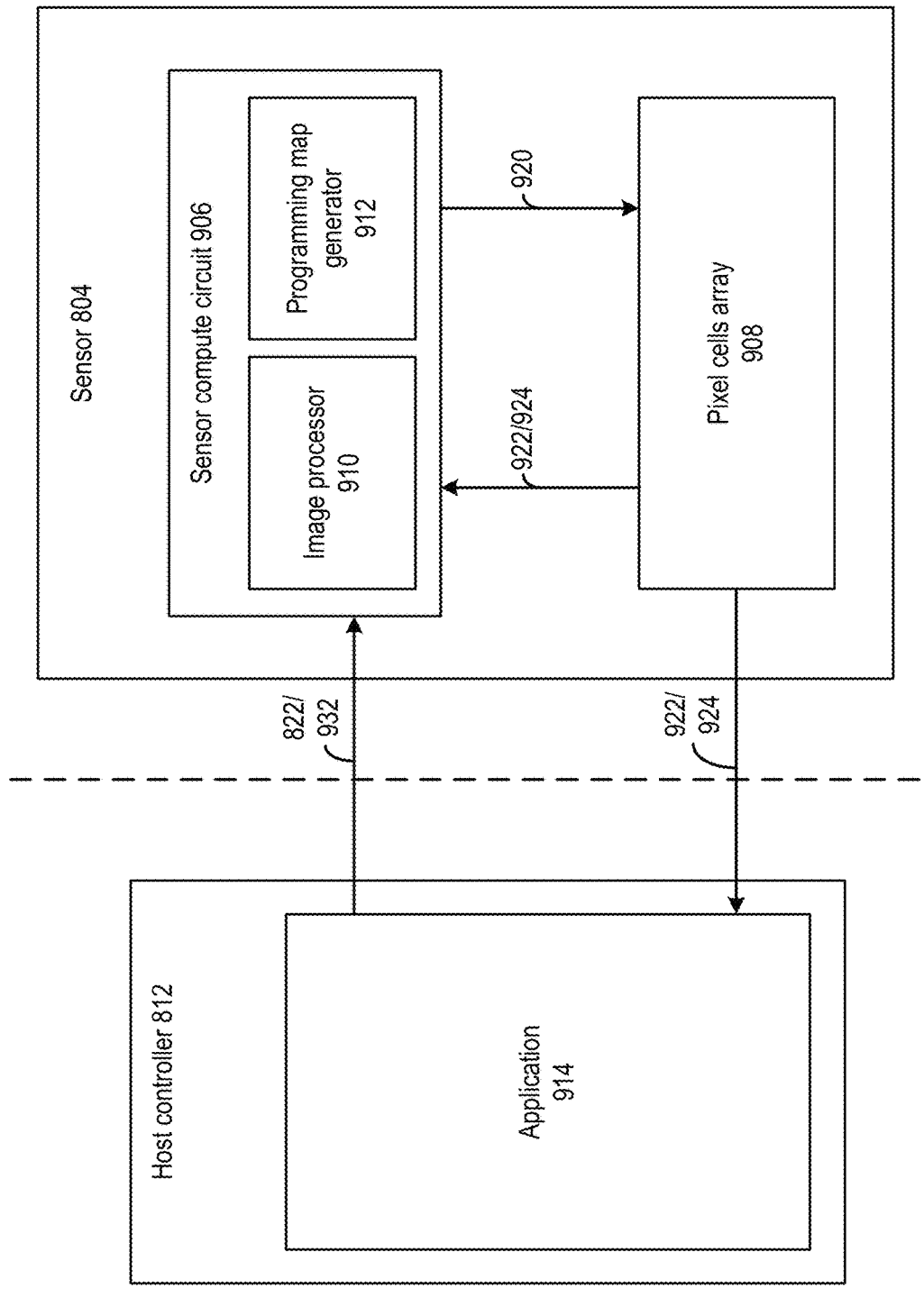
FIG. 9A, FIG. 9B, FIG. 9C, and FIG. 9D illustrate example internal components of the sensor network of FIG. 8A-FIG. 8E.

FIG. 9A, FIG. 9B, FIG. 9C, and FIG. 9D illustrate examples of internal components of host controller 812 and sensors 804-810. As shown in FIG. 9A, sensor 804 includes a sensor compute circuit 906 and a pixel cells array 908. Sensor compute circuit 906 includes an image processor 910 and a programming map generator 912. In some examples, sensor compute circuit 906 can be implemented as an application specific integrated circuit (ASIC), a field programmable gate array (FPGA), or a hardware processor that executes instructions to implement the functions of image processor 910 and programming map generator 912. In addition, host controller 812 may include a general purpose central processing unit (CPU) which can execute an application 914.

Each pixel cell of pixel cells array 908, or blocks of pixel cells, can be individually programmable to, for example, enable/disable outputting of a pixel value, set a resolution of the pixel value output by the pixel cell, etc. Pixel cells array 908 can receive a first programming signals 920, which can be in the form of a programming map that contains programming data for each pixel cell, from programming map generator 912 of sensor compute circuit 906. Pixel cells array 908 can sense light from a scene and generate a first image frame 922 of the scene and based on first programming signals 920. Specifically, pixel cells array 908 can be controlled by first programming signals 920 to operate in different sparsity modes, such as in a full-frame mode in which first image frame 922 includes a full image frame of pixels, and/or in a sparse mode in which first image frame 922 only includes a subset of the pixels specified by the programming map. In some examples, programming map generator 912 can be part of host controller 812, where pixel cells array 908 receive first programming signals 920 from host controller 812.

In addition to generating first programming signals 920, sensor compute circuit 906 can also generate global signals that are sent to each pixel cell of pixel cells array 908. The global signals can include, for example, threshold voltages used for quantization operations in TTS, FD ADC, and PD ADC operations (e.g., a global voltage ramp for FD ADC and PD ADC operation, a flat voltage for TTS operation, etc.), as well as global control signals such as AB and TG signals of FIG. 6B.

Pixel cells array 908 can output first image frame 922 to both host controller 812 and to sensor compute circuit 906. In some examples, pixel cells array 908 can also output first image frame 922 with different pixel sparsity to host controller 812 and to sensor compute circuit 906. For example, pixel cells array 908 can output first image frame 922 with a full image frame of pixels back to sensor compute circuit 906, and output first image frame 922 with sparse pixels defined by first programming signals 920 to host controller 812.

Sensor compute circuit 906 and host controller 812, together with image sensor 804, can form a two-tier feedback system based on first image frame 922 to control the image sensor to generate a subsequent image frame 924. In a two-tier feedback operation, image processor 910 of sensor compute circuit 906 can perform an image processing operation on first image frame 922 to obtain a processing result, and then programming map generator 912 can update first programming signals 920 based on the processing result. The image processing operation at image processor 910 can be guided/configured based on second programming signals 932 included in control data 822 from host controller 812, which can generate the second programming signals 920 based on first image frame 922. Pixel cells array 908 can then generate subsequent image frame 924 based on the updated first programming signals 920. Host controller 812 and sensor compute circuit 906 can then update, respectively, first programming signals 920 and second programming signals 932 based on the subsequent image frame 924.

In the aforementioned two-tier feedback system, second programming signals 932 of control data 822 from host controller 812 can be in the form of a teaching/guidance signal, the result of a neural network training operation (e.g., backward propagation results), etc., to influence the image processing operation and/or programming map generation at sensor compute circuit 906. Host controller 812 can generate the teaching/guidance signals based on not just the first image frame but also other sensor data (e.g., other image frames captured by other image sensors, audio information, motion sensor outputs, inputs from the user, etc.) to determine a context of the light sensing operation by image sensor 804, and then determine the teaching/guidance signal. The context may include, for example, an environment condition image sensor 804 operates in, a location of image sensor 804, features of an object of interest, or any other requirements of application 914. The teaching/guidance signals can be updated at a relatively low rate (e.g., lower than the frame rate) based on the context, given that the context typically changes at a much lower rate than the frame rate, while the image processing operation and the updating of the programming map at sensor compute circuit 906 can occur at a relatively high rate (e.g., at the frame rate) to adapt to the images captured by pixel cells array 908.

Although FIG. 9A illustrates that pixel cells array 908 transmits first image frame 922 and second image frame 924 to both host controller 812 and sensor compute circuit 906, in some cases pixel cells array 908 may transmit image frames of different sparsity to host controller 812 and sensor compute circuit 906. For example, pixel cells array 908 can transmit first image frame 922 and second image frame 924 having full pixels to image processor 910, while a sparse version of both image frames, each including subsets of pixels selected based on first programming signals 920, are sent to host controller 812.

Figure 9B:
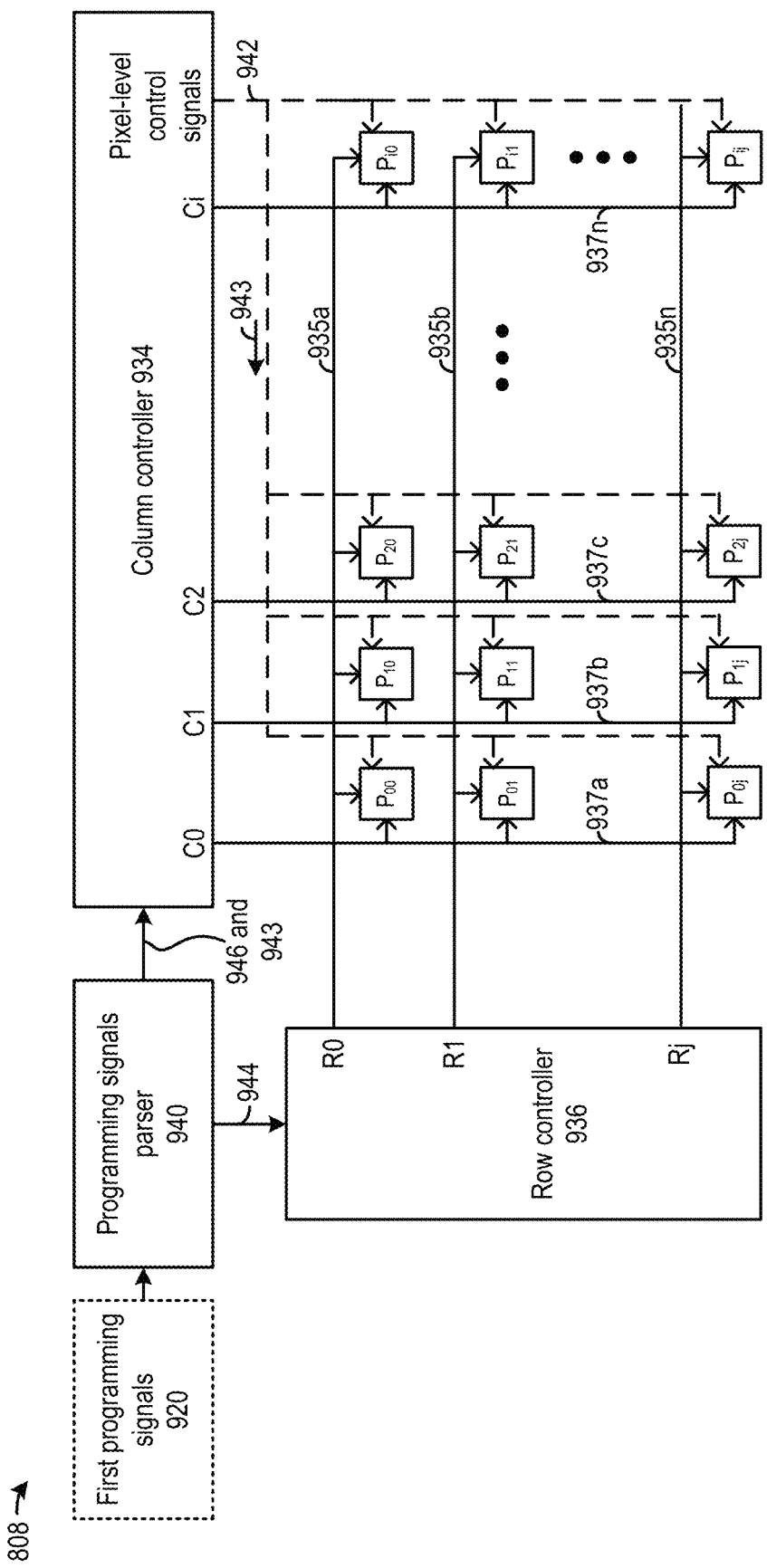

FIG. 9B illustrates examples of internal components of pixel cells array 908. As shown in FIG. 9B, pixel cell array 908 may include a column controller 934, a row controller 936, and a programming signals parser 940. Column controller 934 is connected with column buses 935 (e.g., 935a, 935b, ... 935n), whereas row controller 936 is connected with row buses 937 (e.g., 937a, 937b, ... 937n). One of column controller 934 or row controller 936 is also connected with a programming bus 942 to transmit pixel-level programming signals 943 targeted at a particular pixel cell or a group of pixel cells. Each box labelled $P_{00}$, $P_{01}$, $P_{0j}$, etc. can represent a pixel cell or a group of pixel cells (e.g., a group of 2×2 pixel cells). Each pixel cell or group of pixel cells can be connected to one of column buses 937, one of row buses 935, programming bus 942, and an output data bus to output pixel data (not shown in FIG. 9B). Each pixel cell (or each group of pixel cells) is individually addressable by column address signals 944 on column buses 937 provided by column controller 934, and row address signals 946 on row buses 935 provided by row controller 936, to receive pixel-level programming signals 943 via pixel-level programming bus 942 at a time. Column address signals 944, row address signals 946, as well as pixel-level programming signals 943, can be generated based on first programming signals 920 from programming map generator 912.

Figure 9C:
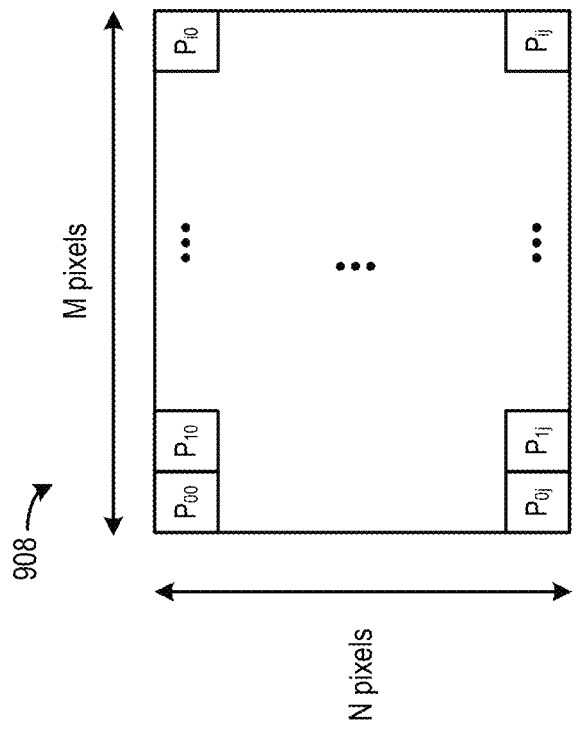
Figure 9C:
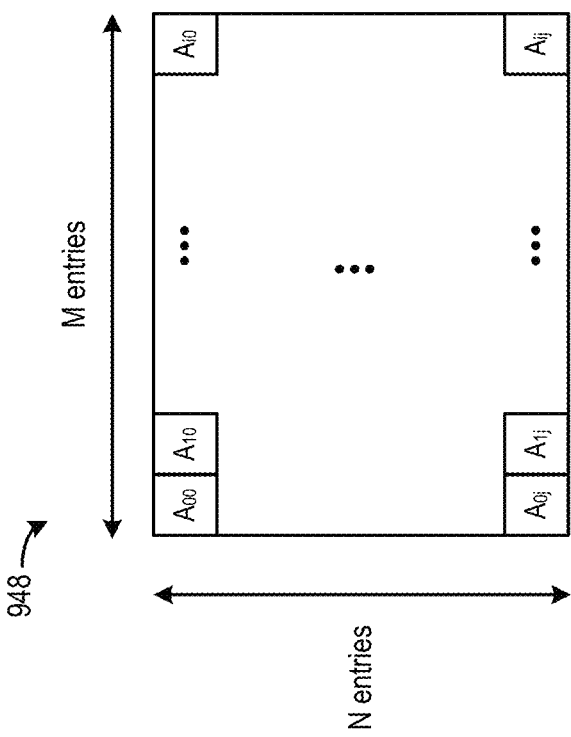

In addition, pixel cells array 908 further includes programming signals parser 940 which can extract pixel-level programming signals 943 from first programming signals 920. In some examples, first programming signals 920 can include a programming map which can include programming data for each pixel cell or each group of pixel cells of pixel cell array 908. FIG. 9C illustrates an example of pixel array programming map 948. As shown in FIG. 9C, pixel array programming map 948 can include a two-dimensional array of pixel-level programming data, with each pixel-level programming data of the two-dimensional array targeted at a pixel cell or a group of pixel cells of pixel cell array 908. For example, in a case where each pixel-level programming datum is targeted at a pixel cell, and assuming pixel cell array 808 has a width of M pixels (e.g., M columns of pixels) and a height of N pixels (e.g., N rows of pixels), pixel array programming map 948 can also have a width of M entries (e.g., M columns of entries) and a height of N entries (e.g., N rows of entries), with each entry storing pixel-level programming data for a corresponding pixel cell. For example, the pixel-level programming data $A_{00}$ at entry (0, 0) of pixel array programming map 948 is targeted at pixel cell $P_{00}$ at pixel location (0, 0) of pixel cell array 908, whereas the pixel-level programming data $A_{01}$ at entry (0, 1) of pixel array programming map 948 is targeted at pixel cell $P_{01}$ at pixel location (0, 1) of pixel cell array 908. In a case where pixel-level programming data is targeted at a group of pixel cells, the number of entries of pixel array programming map 948 along the height and the width can be scaled based on a number of pixel cells in each group.

Pixel array programming map 948 can be configured to support the feedback operations described in FIG. 9B. For example, the pixel-level programming data stored at each entry can individually program each pixel cell (or each group of pixel cells) to, for example, power on or off, to enable or disable outputting of pixel data, to set a quantization resolution, to set a precision of output pixel data, to select a quantization operation (e.g., one of TTS, FD ADC, PD ADC), to set a frame rate, etc. As described above, programming map generator 912 can generate pixel array programming map 948 based on, for example, prediction of one or more ROIs, in which the pixel-level programming data for pixel cells within an ROI are different from the pixel-level programming data for pixel cells outside the ROI. For example, pixel array programming map 948 can enable a subset of pixel cells (or groups of pixel cells) to output pixel data, while the rest of the pixel cells do not output pixel data. As another example, pixel array programming map 948 can control a subset of pixel cells to output pixel data at a higher resolution (e.g., using a larger number of bits to represent each pixel), whereas the rest of pixel cells output pixel data at a lower resolution.

Referring back to FIG. 9B, programming map parser 940 can parse pixel array programming map 948, which can be in a serial data stream, to identify the pixel-level programming data for each pixel cell (or each group of pixel cells). The identification of the pixel-level programming data can be based on, for example, a predetermined scanning pattern by which the two-dimensional pixel array programming map is converted into the serial format, as well as the order by which the pixel-level programming data is received by programming signals parser 940 from the serial data stream. For each entry of programming data, programming signals parser 940 can generate a row address signal 944 and a column address signal 946, and transmit row address signal 944 and column address signal 946 to, respectively, row controller 936 and column controller 934 to select a pixel cells and transmit pixel-level programming signals 943 to the selected pixel cell (or group of pixel cells).

Figure 9D:
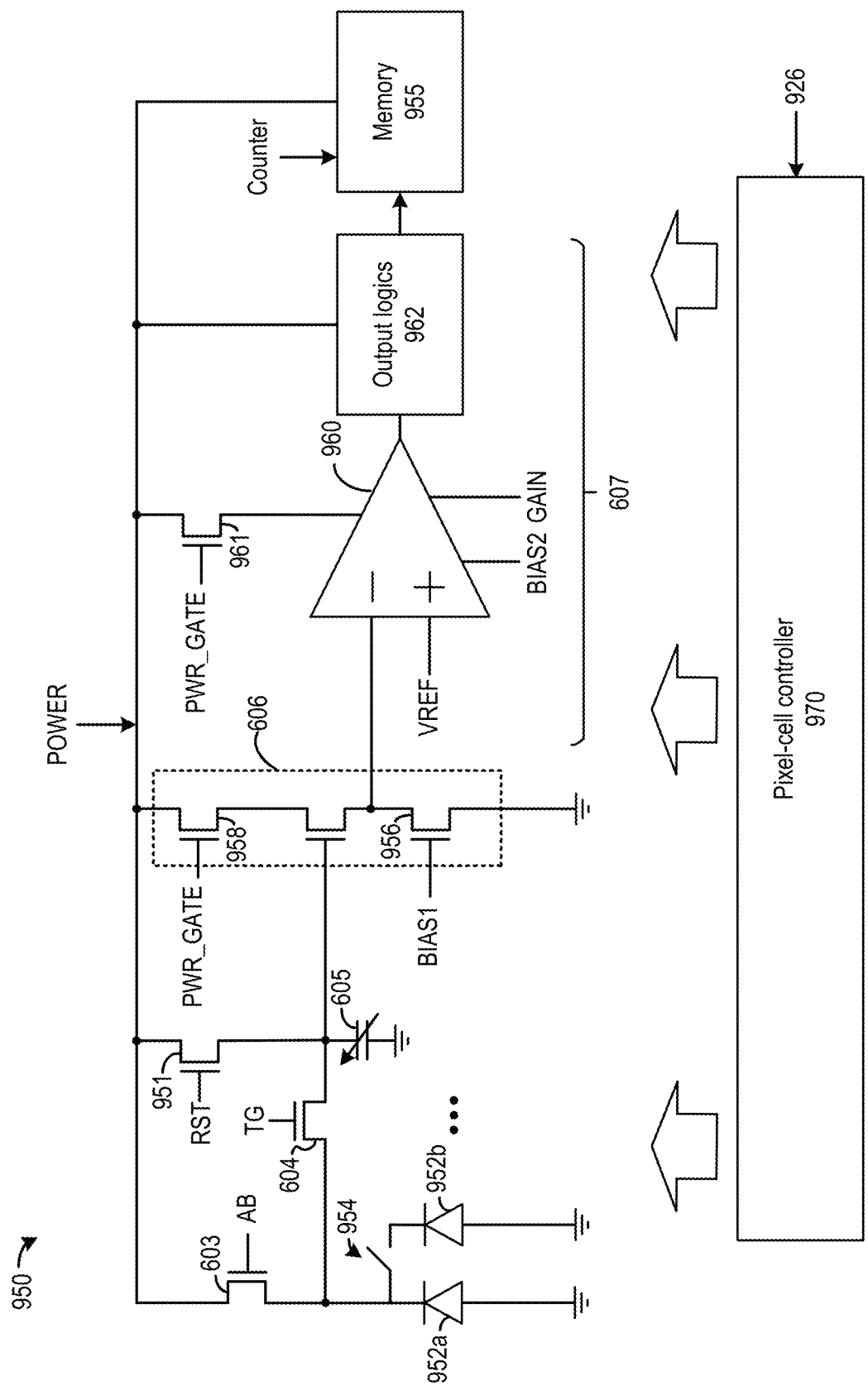

FIG. 9D illustrates example internal components of a pixel cell 950 of pixel cell array 908, which can include at least some of the components of pixel cell 601 of FIG. 6A. Pixel cell 950 can include one or more photodiodes, including photodiodes 952a, 952b, etc., each can be configured to detect light of a different frequency range. For example, photodiode 952a can detect visible light (e.g., monochrome, or one of red, green, or blue color), whereas photodiode 952b can detect infrared light. Pixel cell 950 further includes a switch 954 (e.g., a transistor, a controller barrier layer) to control which photodiode outputs charge for pixel data generation.

In addition, pixel cell 950 further includes electronic shutter switch 603, transfer switch 604, charge storage device 605, buffer 606, quantizer 607 as shown in FIG. 6A, as well as a reset switch 951 and a memory 955. Charge storage device 605 can have a configurable capacitance to set a charge-to-voltage conversion gain. In some examples, the capacitance of charge storage device 605 can be increased to store overflow charge for FD ADC operation for a medium light intensity to reduce the likelihood of charge storage device 605 being saturated by the overflow charge. The capacitance of charge storage device 605 can also be decreased to increase the charge-to-voltage conversion gain for PD ADC operation for a low light intensity. The increase in the charge-to-voltage conversion gain can reduce quantization error and increase the quantization resolution. In some examples, the capacitance of charge storage device 605 can also be decreased during the FD ADC operation to increase the quantization resolution. Reset switch 951 can reset charge storage device 605 prior to capturing of an image frame and/or between FD ADC and PD ADC operations. Buffer 606 includes a current source 956 of which the current can be set by a bias signal BIAS1, as well as a power gate 958 which can be controlled by a PWR_GATE signal to turn on/off buffer 606. Buffer 606 can be turned off as part of disabling pixel cell 950.

In addition, quantizer 607 includes a comparator 960 and output logics 962. Comparator 960 can compare the output of buffer with a reference voltage (VREF) to generate an output. Depending on a quantization operation (e.g., TTS, FD ADC, PD ADC operations), comparator 960 can compare the buffered voltage with different VREF voltages to generate the output, and the output be further processed by output logics 962 to cause memory 955 to store a value from a free running counter as the pixel output. The bias current of comparator 960 can be controlled by a bias signal BIAS2 which can set the bandwidth of comparator 960, which can be set based on the frame rate to be supported by pixel cell 950. Moreover, the gain of comparator 960 can be controlled by a gain control signal GAIN. The gain of comparator 960 can be set based on a quantization resolution to be supported by pixel cell 950. Comparator 960 further includes a power switch 961 which can also be controlled by the PWR_GATE signal to turn on/off comparator 960. Comparator 960 can be turned off as part of disabling pixel cell 950.

In addition, output logics 962 can select the outputs of one of the TTS, FD ADC, or PD ADC operations and based on the selection, determine whether to forward the output of comparator 960 to memory 955 to store the value from the counter. Output logics 962 can include internal memory to store indications, based on the output of comparator 960, of whether the photodiode 952 (e.g., photodiode 952a) is saturated by the residual charge, and whether charge storage device 605 is saturated by the overflow charge. If charge storage device 605 is saturated by the overflow charge, output logics 962 can select TTS output to be stored in memory 955 and prevent memory 955 from overwriting the TTS output by the FD ADC/PD ADC output. If charge storage device 605 is not saturated but the photodiodes 952 are saturated, output logics 962 can select the FD ADC output to be stored in memory 955; otherwise output logics 962 can select the PD ADC output to be stored in memory 955. In some examples, instead of the counter values, the indications of whether photodiodes 952 are saturated by the residual charge and whether charge storage device 605 is saturated by the overflow charge can be stored in memory 955 to provide the lowest precision pixel data.

In addition, pixel cell 950 may include a pixel-cell controller 970, which can include logic circuits to generate control signals such as AB, TG, BIAS1, BIAS2, GAIN, VREF, PWR_GATE, etc. Pixel-cell controller 970 can also be programmed by pixel-level programming signals 926. For example, to disable pixel cell 950, pixel-cell controller 970 can be programmed by pixel-level programming signals 926 to de-assert PWR_GATE to turn off buffer 606 and comparator 960. Moreover, to increase the quantization resolution, pixel-cell controller 970 can be programmed by pixel-level programming signals 926 to reduce the capacitance of charge storage device 605, to increase the gain of comparator 960 via GAIN signal, etc. To increase the frame rate, pixel-cell controller 970 can be programmed by pixel-level programming signals 926 to increase BIAS1 signal and BIAS2 signal to increase the bandwidth of, respectively, buffer 606 and comparator 960. Further, to control the precision of pixel data output by pixel cell 950, pixel-cell controller 970 can be programmed by pixel-level programming signals 926 to, for example, connect only a subset of bits (e.g., most significant bits) of the counter to memory 955 so that memory 955 only stores the subset of bits, or to store the indications stored in output logics 962 to memory 955 as the pixel data. In addition, pixel-cell controller 970 can be programmed by pixel-level programming signals 926 to control the sequence and timing of AB and TG signals to, for example, adjust the exposure period and/or select a particular quantization operation (e.g., one of TTS, FD ADC, or PD ADC) while skipping the others based on the operation condition, as described above.

Figure 10:
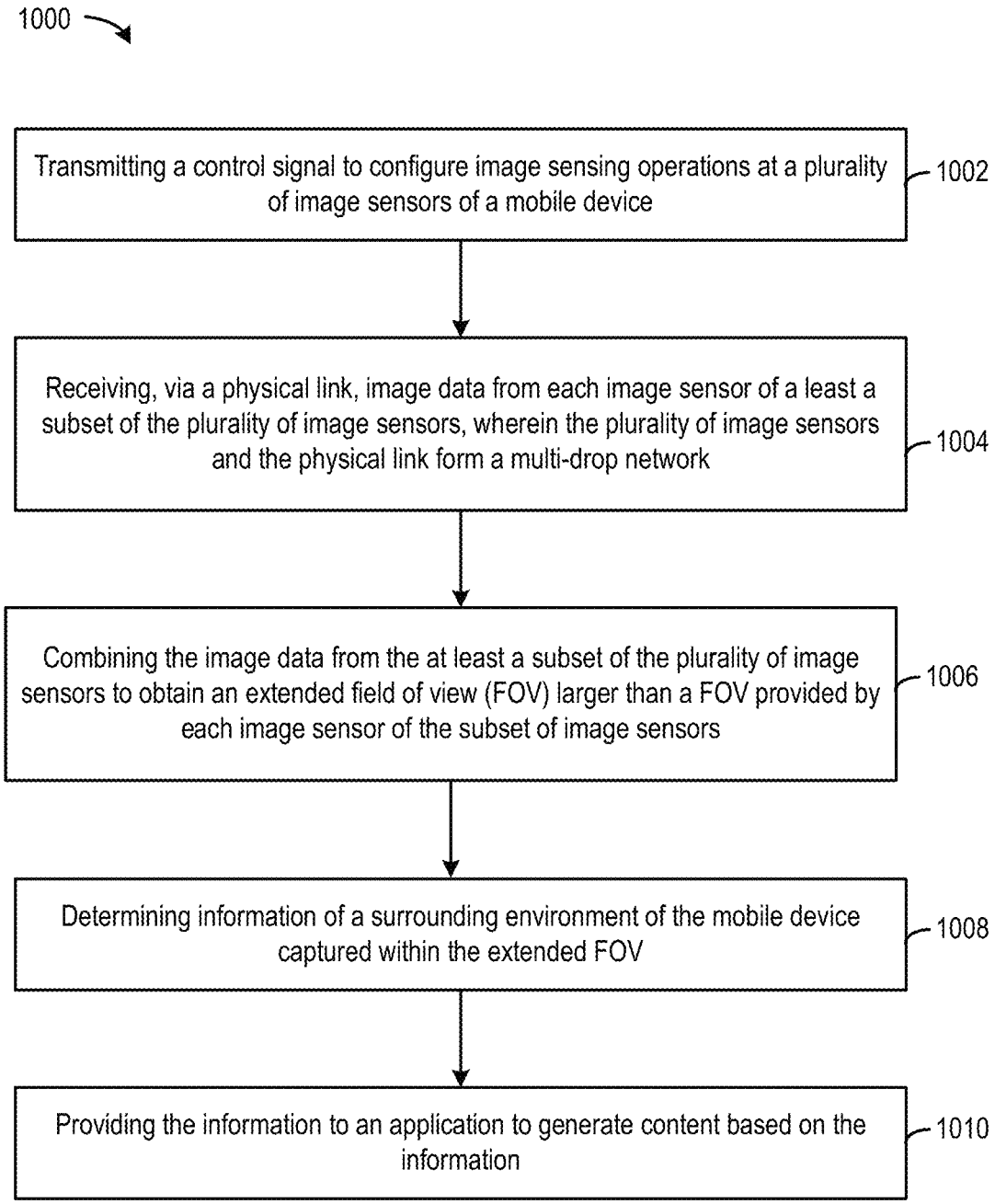
FIG. 10 illustrates a flowchart of an example process for generating content to be output by a mobile device.

FIG. 10 illustrates a method 1000 of generating content to be output by a mobile device, such as mobile device 700. Method 1000 can be performed by a controller of the mobile device, such as host controller 812 of FIG. 8A-FIG. 8E. The mobile device may include a plurality of image sensors facing different direction directions, such as image sensors 702, 704, 706, and 708 of FIG. 7A, as well as audio sensors and motion sensors, to collect sensor data of a surrounding environment of the mobile device. The controller and the sensors are coupled to a physical link and form a multi-drop network, examples of which are shown in FIG. 8B and FIG. 8C. Each image sensor, or groups of image sensors, can be individually programmed. For example, each image sensor/group of image sensors can be individually enabled or disabled. The resolution and frame rate at which each image sensor generates image data can also be different. In addition, each image sensor includes a plurality of pixel cells, and the image sensing operation of each pixel cell, or blocks of pixel cells, can be individually programmed. For example, each pixel (or a block of pixel cells) can be individually enabled or disabled. Examples of the image sensor are shown in FIG. 9A-FIG. 9D.

In step 1002, the controller can transmit a control signal (e.g., control data 822) to select a subset of a plurality of image sensors of the mobile device. In some examples, the control signal can be transmitted via a physical link, such as an I3C bus comprising a serial data line (SDL) and a serial clock line (SCL). To transmit the control signal, the controller can pull down the SCL based on a clock signal pattern, and pull down the SDL based on a serial data pattern including control data 822 and an address of the target sensor(s). In some examples, the mobile device may also include a first physical link (e.g., a bus) for transmitting control data, and a second physical link (e.g., another bus, an optical link, etc.) for transmitting image data. In such a case, the controller can transmit the control signal via the first physical link.

In some examples, the control signal may also include a pixel array programming map (e.g., pixel array programming map 948) that defines programming information for each pixel (or block of pixels) in the target sensor(s). The programming information can define, for example, a subset of pixels to be enabled to perform image sensing operations and/or to transmit pixel data, a frame rate at which the pixel data are generated and transmitted, and a resolution of the image sensing operation.

In step 1004, the controller receives, via a physical link (which can be the same or a different physical link to transmit the control signal), image data from each image sensor of the subset of the plurality of image sensors. In some examples, the control signal can enable each image sensor of the plurality of image sensors. In some examples, the control signal can enable only a subset of the image sensors. Each image sensor can also be controlled by the control signal to only select a subset of the pixels to generate pixel data, such that the image data comprise a sparse image, in which only a subset of pixels contain image data while the rest of the pixels do not contain image data, as shown in FIG. 8E. The subset of the pixels can correspond to, for example, an object of interest. Different sensors may also generate/transmit the image data at different resolutions and/or different frame rates.

In a case where the physical link is an I3C bus, the subset of image sensors can drive another serial data pattern including sensor data on the SDL, and only one of the sensors can transmit sensor data to the controller via the SDL at a time. The timing of transmission of sensor data by each sensor can be controlled based on the control signal, defined based on a predetermined transmission schedule, and/or based on back-off delays when multiple sensors attempt to drive the SDL simultaneously. In a case where the physical link is an optical link, the subset of image sensors can modulate the light in the optical link simultaneously or sequentially to transmit the sensor data.

In step 1008, the controller can combine the image data from the at least a subset of the plurality of image sensors to obtain an extended field of view (FOV) larger than a FOV provided by each image sensor of the subset of image sensors. As described in FIG. 7A-FIG. 7C, the plurality of image sensors may include image sensors facing the same directions and image sensors facing different directions. By combining the image data from the image sensors, an extended FOV bigger than the FOV of each image sensor can be achieved. In some examples, the image sensors of a stereo pair may be configured to capture light of different frequency ranges to support depth sensing.

In step 1008, the controller can determine information of a surrounding environment of the mobile device captured within the extended FOV. As described in FIG. 7B-FIG. 7C, the information can include, for example, a location of one or more physical objects in a scene, a detection result of presence of people (and their gestures) around the user, a tracking result of the body part (e.g., a hand) of the user, etc. The information is provided based on extending the FOV of the image sensors.

In step 1010, the controller can provide the information to an application to generate content based on the information. For example, to provide an VR/AR/MR experience, the application can replace the detected objects with virtual objects, generate audio/display signals indicating that a person is standing behind the user, etc.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A mobile device comprising:
a physical link;
a plurality of image sensors, each of the plurality of image sensors:
being configured to transmit image data via the physical link; and
having a different orientation than an adjacent image sensor; and
a controller coupled to the physical link, whereby the physical link, the plurality of image sensors, and the controller form a multi-drop network;
wherein the controller is configured to:
determine an image capture operation for the plurality of image sensors, wherein the image capture operation reduces a volume of image data transmitted over the multi-drop network by determining a subset of image sensors to capture images of one or more objects of interest;
transmit a control signal to configure image sensing operations at the plurality of image sensors based on the image capture operation;
receive, via the physical link, image data from at least a subset of the plurality of image sensors;
combine the image data from the at least a subset of the plurality of image sensors to obtain an extended field of view (FOV) larger than a FOV provided by each image sensor of the subset of image sensors;
determine information of a surrounding environment of the mobile device captured within the extended FOV; and
provide the information to an application to generate content based on the information.

2. The mobile device of claim 1, wherein based on the image capture operation, the controller is configured to select the subset of the plurality of image sensors to transmit the image data and disable the rest of the plurality of image sensors.

3. The mobile device of claim 2, wherein the image data is first image data;
  wherein the controller is configured to, based on transmitting the control signal:
    control the subset of the plurality of image sensors to transmit the first image data at a first resolution; and
    control the rest of the plurality of image sensors to transmit second image data at a second resolution; and
  wherein the first resolution is higher than the second resolution.

4. The mobile device of claim 2, wherein the image data is first image data;
  wherein the controller is configured to, based on transmitting the control signal:
    control the subset of the plurality of image sensors to transmit the first image data at a first frame rate; and
    control the rest of the plurality of image sensors to transmit second image data at a second frame rate; and
  wherein the first frame rate is higher than the second frame rate.

5. The mobile device of claim 2, wherein the information of the surrounding environment includes a tracking result of an object of interest; and
  wherein the controller is configured to select the subset of the plurality of image sensors based on determining that the image data generated by the subset of the plurality of image sensors is likely to contain one or more images of the object.

6. The mobile device of claim 5, wherein the controller is configured to determine that the image data generated by the subset of the plurality of image sensors is likely to contain one or more images of the object based on detecting features of the object in prior image data from the subset of the plurality of image sensors.

7. The mobile device of claim 5, wherein the controller is configured to determine a prior trajectory of relative movement between the object and the mobile device based on prior image data from the plurality of image sensors; and
  wherein the controller is configured to:
    predict a trajectory of the object based on the prior trajectory; and
    determine that the image data generated by the subset of the plurality of image sensors is likely to contain one or more images of the object based on the predicted trajectory.

8. The mobile device of claim 1, wherein each image sensor of the plurality of image sensors includes an array of pixel cells; and
  wherein the controller is configured to, based on the image capturing operation, selectively configure a particular subset of pixel cells of the array of pixel cells in one or more image sensor of the plurality of image sensors to enable.

9. The mobile device of claim 8, wherein the controller is configured to, based on transmitting the control signal:
  enable a first subset of pixel cells of the array of pixel cells of a first image sensor of the plurality of image sensors to transmit first image data via the physical link to the controller; and
  enable a second subset of pixel cells of the array of pixel cells of a second image sensor of the plurality of image sensors to transmit second image data via the physical link to the controller; and
  wherein the first subset and the second subset are different.

10. The mobile device of claim 8, wherein the controller is configured to, based on transmitting the control signal:
  enable a first subset of pixel cells of the array of pixel cells of a first image sensor of the plurality of image sensors to generate first image data at a first resolution; and
  enable a second subset of pixel cells of the array of pixel cells of the first image sensor to generate second image data at a second resolution; and
  wherein the first resolution is higher than the second resolution.

11. The mobile device of claim 8, wherein the controller is configured to, based on transmitting the control signal:
  set a first dynamic range of a first subset of pixel cells of the array of pixel cells of a first image sensor of the plurality of image sensors;
  set a second dynamic range of a second subset of pixel cells of the array of pixel cells of the first image sensor; and
  wherein the first dynamic range is higher than the second dynamic range.

12. The mobile device of claim 8, wherein the control signal identifies pixel cells of the particular subset of the pixel cells in the array of pixel cells for each image sensor of the one or more image sensors.

13. The mobile device of claim 8, wherein the control signal includes a guidance signal; and
  wherein a first image sensor of plurality of image sensors is configured to determine the particular subset of the pixel cells in the array of pixel cells locally based on the guidance signal.

14. The mobile device of claim 13, wherein the guidance signal specifies features of an object of interest;
  wherein the first image sensor is configured to:
    determine a region of interest including the object of interest based on the guidance signal; and
    determine the particular subset of the pixel cells in the array of pixel cells based on the region of interest.

15. The mobile device of claim 8, wherein the particular subset of the pixel cells in the array of pixel cells is determined based on at least one of: a tracking result of an object of interest, or a movement of the mobile device.

16. The mobile device of claim 1, wherein the image data from at least a first image sensor and a second image sensor of the plurality of image sensors are combined; and
  wherein the first image sensor and the second image sensor face different directions.

17. The mobile device of claim 1, wherein the image data from at least a first image sensor and a second image sensor of the plurality of image sensors are combined;
  wherein the first image sensor is configured to capture light of a first frequency range; and
  wherein the second image sensor is configured to capture light of a second frequency range different from the first frequency range.

18. The mobile device of claim 1, wherein the physical link comprises at least one of: a bus based on I3C specification, or an optical link.

19. A method comprising:
  determining an image capture operation for a plurality of image sensors of a mobile device, wherein:
    the plurality image sensors are part of a multi-drop network; and
    the image capture operation reduces a volume of image data transmitted over the multi-drop network by determining a subset of image sensors to capture images of one or more objects of interest;

transmitting a control signal to configure image sensing operations at the plurality of image sensors based on the image capture operation, wherein each of the plurality of image sensors have a different orientation than an adjacent image sensor;

receiving, via a physical link, image data from each image sensor of the subset of the plurality of image sensors, wherein the plurality of image sensors and the physical link form the multi-drop network;

combining the image data from the subset of the plurality of image sensors to obtain an extended field of view (FOV) larger than a FOV provided by each image sensor of the subset of image sensors;

determining information of a surrounding environment of the mobile device captured within the extended FOV; and providing the information to an application to generate content to be output by the mobile device based on the information.

20. The method of claim 19, further comprising: based on transmitting the control signal, selecting the subset of the plurality of image sensors to transmit the image data and disable the rest of the plurality of image sensors.

\* \* \* \* \*